(12) United States Patent
Anandan et al.

(10) Patent No.: US 11,001,506 B2
(45) Date of Patent: May 11, 2021

(54) METHOD OF PRODUCING HIGH PERFORMANCE LITHIUM TITANATE ANODE MATERIAL FOR LITHIUM ION BATTERY APPLICATIONS

(71) Applicant: INTERNATIONAL ADVANCED RESEARCH CENTRE FOR POWDER METALLURGY AND NEW MATERIALS (ARCI), Gurgaon (IN)

(72) Inventors: Srinivasan Anandan, Hyderabad (IN); Parakandy Muzhikara Pratheeksha, Hyderabad (IN); Ravula Vijay, Hyderabad (IN); Tata Narasinga Rao, Hyderabad (IN)

(73) Assignee: INTERNATIONAL ADVANCED RESEARCH CENTRE FOR POWDER METALLURGY AND NEW MATERIALS (ARCI), Gurgaon (IN)

( * ) Notice: Subject to any disclaimer, the term of this patent is extended or adjusted under 35 U.S.C. 154(b) by 0 days.

(21) Appl. No.: 16/463,088

(22) PCT Filed: Feb. 17, 2018

(86) PCT No.: PCT/IN2018/050080
§ 371 (c)(1),
(2) Date: May 22, 2019

(87) PCT Pub. No.: WO2018/154595
PCT Pub. Date: Aug. 30, 2018

(65) Prior Publication Data
US 2019/0284060 A1    Sep. 19, 2019

(30) Foreign Application Priority Data
Feb. 21, 2017  (IN) .............................. 201711006147

(51) Int. Cl.
*C01G 23/00*     (2006.01)
*B02C 17/10*     (2006.01)
(Continued)

(52) U.S. Cl.
CPC ............ *C01G 23/005* (2013.01); *B02C 17/10* (2013.01); *H01M 4/485* (2013.01); *H01M 4/625* (2013.01);
(Continued)

(58) Field of Classification Search
CPC .......... B82Y 30/00; C01G 23/005; B32B 5/16
(Continued)

(56) References Cited

U.S. PATENT DOCUMENTS 6,372,384 B1   4/2002  Fujimoto et al.
6,827,921 B1  12/2004  Singhal et al.
(Continued)

FOREIGN PATENT DOCUMENTS

CN    101587948 A    11/2009
CN    102024944 A     4/2011
(Continued)

OTHER PUBLICATIONS

Han, S-W, et al., "Effects of high-energy milling on the solid-state synthesis of pure nano-sized Li4Ti5O12 for high power lithium battery applications," Applied Physics A (2014), vol. 114, pp. 925-930.
(Continued)

*Primary Examiner* — Khanh T Nguyen
(74) *Attorney, Agent, or Firm* — Cantor Colburn LLP

(57) ABSTRACT

The method of producing lithium titanate anode material for lithium ion battery applications is comprising of: a) mixing of mixed phase having 60-80% anatase and 20-40% rutile of $TiO_2$ as titanium precursor with $Li_2CO_3$ as lithium precursor in a stoichiometric ratio of 5:4 and adding with 2 to 5%
(Continued)

stearic acid as process control agent as well as carbon precursor; b) milling in horizontal attrition milling unit maintained with the ball to powder ratio of 10:1-12:1 at 250-500 rpm for 0.5 to 2 hrs c) repeating the milling for 40 to 48 times; d) palletisation of the milled powder to a diameter of 30-35 mm under a pressure of 0.5-1 ton; e) annealing under inert atmosphere at a temperature of 700-900° C. for a period of 2-12 hrs; and f) grinding the resultant annealed composite powder to a fine powder. Resultant powder has shown excellent electrochemical properties in terms of charge-discharge, cyclic-stability and rate capability.

6 Claims, 14 Drawing Sheets

(51) Int. Cl.
| | |
|---|---|
| *H01M 4/485* | (2010.01) |
| *H01M 4/62* | (2006.01) |
| *H01M 10/0525* | (2010.01) |
| *B82Y 30/00* | (2011.01) |
| *H01M 4/02* | (2006.01) |

(52) U.S. Cl.
CPC ......... *H01M 10/0525* (2013.01); *B82Y 30/00* (2013.01); *C01P 2002/72* (2013.01); *C01P 2002/85* (2013.01); *C01P 2004/03* (2013.01); *C01P 2004/04* (2013.01); *C01P 2004/51* (2013.01); *C01P 2004/62* (2013.01); *C01P 2004/80* (2013.01); *C01P 2006/40* (2013.01); *H01M 2004/027* (2013.01)

(58) Field of Classification Search
USPC ........ 361/505; 423/598; 429/231.9; 428/403
See application file for complete search history.

(56) References Cited

U.S. PATENT DOCUMENTS

| | | | |
|---|---|---|---|
| 6,890,510 | B2 | 5/2005 | Spitler et al. |
| 7,211,350 | B2 | 5/2007 | Amatucci |
| 2007/0243467 | A1 | 10/2007 | Zaghib et al. |
| 2008/0280141 | A1* | 11/2008 | Dobbs ................ B32B 5/16 428/403 |
| 2012/0141360 | A1* | 6/2012 | Park .................. C01G 23/005 423/598 |
| 2012/0244439 | A1 | 9/2012 | Yu et al. |
| 2013/0063867 | A1* | 3/2013 | Naoi .................. B82Y 30/00 361/505 |

FOREIGN PATENT DOCUMENTS

| | | |
|---|---|---|
| CN | 102364729 A | 2/2012 |
| CN | 102664252 A | 9/2012 |
| CN | 103022462 A | 4/2013 |
| CN | 103730649 A | 4/2014 |

OTHER PUBLICATIONS

International Search Report dated May 28, 2018; International Application No. PCT/IN2018/050080; International Filing Date Feb. 17, 2018 (2 pages).
Jhan, Y.R., et al., "Synthesis of entanglement structure in nanosized Li4Ti5O12/multi-walled carbon nanotubes composite anode material for Li-ion batteries by ball-milling-assisted solid-state reaction," Journal of Power Sources 198 (2012), pp. 294-297.
Johnson, B.A., et al., "Characterization of commercially available lithium-ion batteries," Journal of Power Sources 70 (1998), pp. 48-54.
Kuo, Y-C, et al., "One-pot sol-gel synthesis of Li4Ti5O12/C anode materials for high-performance Li-ion batteries," Electrochimica Acta 142 (2014), pp. 43-50.
Li, B., et al., "Synthesis and Characterization of Long Life Li4Ti5O12/C Composite Using Amorphous TiO2 Nanoparticles," Int. J. Electrochem. Sci., vol. 6, 2011, pp. 3210-3223.
Matsui, E., et al., "Solid-State Synthesis of 70 nm Li4Ti5O12 Particles by Mechanically Activating Intermediates with Amino Acids," Journal of the American Ceramic Society, vol. 91, No. 5, (2008), pp. 1522-1527.
Nitta, N., et al., "High-Capacity Anode Materials for Lithium-Ion Batteries: Choice of Elements and Structures for Active Particles," Part. Part. Syst. Charact., 31, 2014, pp. 317-336.
Obrovac, M.N., et al., "Alloy Negative Electrodes for Li-Ion Batteries", Chem. Rev. 2014, 114, pp. 11444-11502.
Peled, E., et al., "Improved Graphite Anode for Lithium-Ion Batteries Chemically Bonded Solid Electrolyte Interface and Nanochannel Formation," J. Electrochem. Soc., vol. 143, No. 1, Jan. 1996, pp. L4-L7.
Prakash, A.S., et al., "Solution-Combustion Synthesized Nanocrystalline Li4Ti5O12 As High-Rate Performance Li-Ion Battery Anode," Chem. Mater., vol. 22, No. 9, 2010, pp. 2857-2863.
Qiu, X-P., et al., "Synthesis and characterization of magnetic nanoparticles," Chinese Journal of Chemistry, vol. 18, No. 6, 2000, pp. 834-837.
Qiu, Z., et al., "Li4Ti5O12 Nanoparticles Prepared with Gel-hydrothermal Process as a High Performance Anode Material for Li-Ion Batteries," Chin. J. Chem, 28, 2010, pp. 911-915.
Shen, C-m., et al., "Preparation and characterization of nanocrystalline Li4Ti5O12 by sol-gel method," Materials Chemistry and Physics, 78 (2002), pp. 437-441.
Wang, G., et al., "Facile synthesis and high rate capability of Li4Ti5O12/C composite materials with controllable carbon content," J. Appl. Electrochem 40 (2010) 821-831.
Written Opinion dated May 28, 2018; International Application No. PCT/IN2018/050080; International Filing Date Feb. 17, 2018 (6 pages).
Wu, F., et al., "Characterization of spherical-shaped Li4Ti5O12 prepared by spray drying," Electrochimica Acta 78 (2012), pp. 331-339.
Yan, B., et al., "Novel understanding of carbothermal reduction enhancing electronic and ionic conductivity of Li4Ti5O12 anode," J. Mater. Chem. A, 2015, 3, 11773-11781.
Yan, G., et al., "Ball milling-assisted sol-gel route to Li4Ti5O12 and its electrochemical properties," Journal of Alloys and Compounds, 470 (2009), pp. 544-547.
Yoshio, M., et al., "Effect of Carbon Coating on Electrochemical Performance of Treated Natural Graphite as Lithium-Ion Battery Anode Material," Journal of the Electrochemical Society 147 (4) (2000), pp. 1245-1250.
Yuan, T., et al., "Different Effect of the Atmospheres on the Phase Formation and Performance of Li4Ti5O12 Prepared from Ball-Milling-Assisted Solid-Phase Reaction with Pristine and Carbon-Precoated TiO2 as Starting Materials," The Journal of Physical Chemistry C, 115, Mar. 2, 2011, pp. 4943-4952.
Zhu, G.N., et al., "Carbon-coated nano-sized Li4Ti5O12 nanoporous micro-sphere as anode material for high-rate lithium-ion batteries," Energy Environ. Sci., 2011, 4, pp. 4016-4022.
Zoz, H., et al., "Alternative Mechanical Milling routes for grain-refinement of conventional High-Speed Steel powder for later consolidation by SPS," Metall 57(10): 640-648, Jan. 2003.

* cited by examiner

METHOD OF PRODUCING HIGH PERFORMANCE LITHIUM TITANATE ANODE MATERIAL FOR LITHIUM ION BATTERY APPLICATIONS

CROSS-REFERENCE TO RELATED APPLICATIONS

This application is a U.S. national stage application of International Application No. PCT/IN2018/050080 entitled "A METHOD OF PRODUCING HIGH PERFORMANCE LITHIUM TITANATE ANODE MATERIAL FOR LITHIUM ION BATTERY APPLICATIONS", which has an international filing date of 17 Feb. 2018, and which claims priority to Indian Patent Application No. 201711006147, filed 21 Feb. 2017, and all the benefits therefrom under 35 U.S.C. § 119, the content of both of which are incorporated herein by reference in their entirety.

FIELD OF INVENTION

The present invention relates to a method of producing high performance lithium titanate $Li_4Ti_5O_{12}$ (LTO) anode for lithium ion battery applications, more especially a process of producing LTO using precursors of $TiO_2$ and $Li_2CO_3$ along with carbon by making use of Horizontal attrition milling technique which produces highly crystalline LTO with smaller particle size. The particle morphology was found to be non-uniform, well resolved particles with an average particle size of 342 nm. The smaller particles produced from Horizontal attrition mill may help in improving the lithium ion diffusion kinetics by shortening the lithium ion diffusion length. Carbon precursor used avoids stacking during milling which acts on a dual role as Process control agent (PCA) and carbon precursor. Annealing of milled precursors under inert atmosphere with PCA creating oxygen vacancies for which the charge compensation was done by converting $Ti^{4+}$ ions into $Ti^{3+}$ ions. The presence of $Ti^{3+}$ in addition to $Ti^{4+}$ in LTO greatly improves the electronic and ionic conductivity of the anode developed. The outcome of electrochemical characterization in half-cell configuration was around 156 mA h $g^{-1}$ at 1 C and 97 mA h g at 10 C and in full cell configuration the capacity was around 0.47 mAh at 1 C rate with 98.5% retention after 650 charge-discharge cycles which is very promising. Because of the promising electrochemical properties in terms of charge discharge capacity, and rate capability material developed using the invented technique may be suitable for high energy density lithium ion battery application. The method developed by us has the advantage of being cost effective, high kinetic energy system compared to other milling techniques and is less time consuming.

BACKGROUND OF THE INVENTION

Electric vehicle industry expects high energy density lithium ion batteries and therefore researchers are in search of new anode and cathode materials. Present study focuses on development of anode material, which becomes a suitable candidate for high energy density lithium ion battery applications and to design a scalable synthesis technique. Graphite is commonly used commercially available anode (Johnson et al, *J. Power Sources* 70 (1998), 48-54, Yoshio et al *J. Electrochem. Soc.* 147 (2000) 1245) and has specific capacity of 372 mA $hg^{-1}$ (Peled et al, *J Electrochem. Soc.* 143 (1996) L4). It has voltage plateau of around 0.02 V making it prone to SEI and therefore affecting the electrochemical performance. Many anode materials involved intercalation (Nitta et al *Part. Part. Syst. Charact.* 31, 2014, 317-336) alloying and conversion mechanism (Obrovac et al *Chem. Rev.* 144 (2014), 11444-11502) are studied in-depth. Silica becomes one of the most hunted anodes, which becomes the material with highest theoretical capacity around 4200 mA $hg^{-1}$. Since it accommodates more number of lithium ions it undergoes huge volume expansion, which numbers to be 400% and therefore is difficult to master it. $TiO_2$ in both rutile and anatase form also becomes a promising anode with a capacity of around 350 mA $hg^{-1}$ but has poor cycle life and rate capability owing to its semiconducting nature. In the present invention, we have chosen LTO as anode material owing to its high specific capacity of 175 mA $hg^{-1}$ and stable voltage plateau of 1.55V. Since the voltage range is higher than the electrolyte decomposition voltage, it is free from solid electrolyte interface (SEI) formation. It accommodates three lithium ions and hence becomes a zero strain anode. Being a strain free anode, recently LTO has gained attention of many portable and electric vehicle battery industries. Further, long cycle life, high thermal stability (up to 280° C.), abundant and cost-effective Ti source and high rate capability properties of LTO making it more attractive. However, drawbacks such as poor electronic and ionic conductivity limit its electro-chemical performance. Doping with cations, carbon coating and surface coatings have been reported so far to overcome the above said limitations. Wet chemical methods such as hydrothermal (Qiu et al *Chinese J of Chemistry*, 28 (2010) 911), sol-gel (Shen et al, *Materials chemistry and physics*, 78 (2003) 437), spray drying (Wu et al, *Electrocheima acta* 78 (2012) 331), combustion (Prakash et al, *Chem. Mater,* 22 (2010) 2857) as well as solid state techniques were carried out to synthesize LTO anode. Since lithium titanate is lithiated form of titanium dioxide, there are several reports on synthesis of LTO from $TiO_2$. Prior art reported the synthesis of LTO from either anatase or rutile phases of $TiO_2$. Further, coating of LTO with anatase or rutile $TiO_2$ was also reported to improve the electronic conductivity through the formation of $Ti^{3+}$ ions. But when $TiO_2$ as such was used as anode material for lithium ion batteries it resulted in poor electrochemical performance due to agglomeration and low packing density of $TiO_2$ nanoparticles. In contrast when $TiO_2$ (mixed phase) was used for the synthesis of LTO, it resulted in excellent electrochemical performance. Though many methods have reported to synthesize LTO, the factors such as (a) cost, (b) scalability and simplicity of material technology determine its commercial viability. Considering the above, in the present invention, we have adopted a sustainable and scalable low cost, energy efficient solid state method for the synthesis of LTO that can be suitable for electric vehicle lithium ion batteries. Since it is a single step large scale process devoid of solvents and large number of precursors, it may be considered as potential process for real application.

Prior-art patents as well as non-patent literature related to the field of present invention available in public domains are discussed below.

Singhal et al. [U.S. Pat. No. 6,827,921 B1/2004] invented a method of synthesizing nano sized lithium titanate from titanium and lithium precursors by refluxing them with an organic solvent followed by heat treatment in inert gas atmosphere. Here anatase $TiO_2$ was used and concluded that the presence of vacant interstitial sites allows diffusion of lithium into $TiO_2$ resulting in the formation of lithium titanate. The wet chemical method involved the use of expensive organic solvents, tedious reflux process and intermediate heating step. Zaghib et al. (U.S. Pat. No. 0,243,467 A1/2007) claimed a method of producing $Li_4Ti_5O_{12}$ with metal ion dopants along with carbon coating. The process was found to be multi-step process involving carbon coating of $TiO_2$ followed by milling with lithium precursor. Further, milling period was found to be long (24 h) and involved two step annealing process. Hence the process is tedious and less attractive for commercial applications. Fujimoto et al. (U.S. Pat. No. 6,372,384 B1/2002) reported a method of producing doped lithium titanate for improved load characteristics of lithium ion batteries. It disclosed that the possible phase formation temperature for lithium titanate was around 800-900° C. When the temperature is below 800° C., it resulted in failure of phase formation and when 900° C. exceeds then leads to the formation of impurities phases which degrade the electrochemical performance. Spliter et al. (U.S. Pat. No. 6,890,510 B2/2005) claimed a method of producing pure lithium titanate nano-powders. The technique reported here adapts a combination of wet chemical as well as solid-state technique. The method involved two step calcination and two-step synthesis process was found to be more tedious among the above-mentioned prior art patented works. Amatucci et al. (U.S. Pat. No. 7,211,350 B2/2007) claimed a milling method for producing lithium titanate nano-powders by shorter annealing time. The resulting nano sized lithium titanate anode produced a capacity of 100 mA $hg^{-1}$ at 10 C rate and was found to be stable over 500 cycles. Though the synthesized material shows promising electrochemical performance, the scalability of the process is concern. Yu et al (U.S. Pat. No. 0,244,439 A1/2012) invented lithium titanate anode containing some of the dopants like potassium or phosphorous and reported to use the technique of ball milling with $TiO_2$ and lithium carbonate as the precursors. The Chinese patent No. CN101587948 B) discloses the synthesis of carbon coated lithium titanate by a two step ball milling and two step annealing process. Initially various inorganic salts of titanium dioxide in single phase were milled followed by annealing at lower temperature. Further the annealed intermediate product was milled with carbon source and calcined under inert atmospheres to form the carbon coated lithium titanate powders.

According to CN102364729 A Lithium titanate was synthesized using a wet milling process followed by two step calcination for carbon coating on lithium titanate powders using activated carbon material. Various solvents for milling and various carbon precursors were used for optimization. The synthesis technique required two step annealing process under oxidizing atmosphere to form activated carbon coated lithium titanate material.

In another Patent application No. CN102664252 A, carbon coated lithium titanate was synthesized using a single step ball milling process. But a mixture of acetylene black and CNT was used as carbon precursor. It is seen that usage of CNT may improve the electrochemical performance, however the difference in the density between LTO and CNT as well as the tedious method and expensive process cost for synthesizing CNTs making the process inefficient.

A two step synthesis process was disclosed in CN103022462 A, where a combination of solid state reaction followed by spray drying was carried out for the synthesis of carbon coated lithium titanate. Multi-step process including slurry preparation, drying, spray drying and annealing seems to be time consuming making the method less attractive and less economical.

As per CN103730649 A, Carbon coated lithium titanate was prepared using ball milling process in which inorganic salts of titanium and lithium are milled together to form the mixture. Further carbon coating was carried out by polymerization process using polymer as carbon precursor under inert atmosphere. This was then followed by spray drying and two step annealing process to produce single phase crystalline, carbon coated lithium titanate anode, which is not attractive for commercial application.

Li et al [Li. et al *Int. J. Electrochem. Sci.*, 6 (2011) 3210-3223] synthesized carbon coated LTO by ball milling technique using amorphous $TiO_2$ nano-clusters as raw material. Unlike in the present invention, where commercial cost-effective $TiO_2$ is used as precursor, here $TiO_2$ synthesized by micro-emulsion process using CTAB as structure directing agent was used for milling. Since the milling technique followed was wet milling in this study, it requires additional heating step to remove the moisture. Further, carbon coating was carried out to improve the electronic conductivity, whereas in the present invention stearic acid used in the milling process plays a dual role, i.e. it acts as carbon source as well as process control agent to improve electronic conductivity and to avoid powder stacking respectively. Spinel $Li_4Ti_5O_{12}$ performance highly depends on both the electronic and ionic conductivity, however, developing a low-cost strategy to improve its electronic and ionic conductivity still remains challenging. In study carried out by Yan et al [Yan et al. *J. Mater. Chem. A*, (2015), 3,11773], a facile cost-saving carbothermal reduction method was followed to synthesize micro scaled surface modified Ti (III) spinel $Li_4Ti_5O_{12}$ particles using anatase—$TiO_2$, $Li_2CO_3$, and acetylene black (AB) as Ti, Li and carbon precursor respectively. Remarkably, this indigenous design can easily eliminate the influence of the residual carbon, and thus makes it possible to individually study the effect of the Ti (III) on the bulk $Li_4Ti_5O_{12}$. The presence of Ti (III) on the surface of $Li_4Ti_5O_{12}$ not only improves the electronic conductivity, but also enhances the $Li^+$ diffusion coefficient, therefore decreasing electrochemical polarization and improving the rate performance of LTO. In another study, $Li_4Ti_5O_{12}$@CNT composites were prepared by a controlled in situ growth of CNTs on $Li_4Ti_5O_{12}$. Since CNTs improve electronbridge between LTO particles, the electronic conductivity of $Li_4Ti_5O_{12}$@CNT composites is better than that of pristine LTO and hence $Li_4Ti_5O_{12}$@CNT composites show superior lithium storage properties comparable to the pristine $Li_4Ti_5O_{12}$. Further, lithium titanate was also prepared by ball milling using micron sized $TiO_2$ particles and lithium hydroxide as Ti and Li precursor respectively. However, the whole process involved a two-step milling, intermediate drying and then annealing again to produce lithium titanate.

It is known that smaller particle size and well crystallinity are both crucial for $Li_4Ti_5O_{12}$ to achieve higher capacity and higher rate capability. Considering this, Zhu et al has developed [Zhu, et al. *Energy Environ. Sci.*, 4 (2011) 4016] a facile method to synthesize a carbon-coated nano-sized $Li_4Ti_5O_{12}$ by a combination of pre-carbon coating and spray drying. Though micron-size spherical particles used in this study induces large tap density and consequently enhance the volumetric energy density, the commercial $TiO_2$ used for milling was initially carbon coated using sucrose by ball milling followed by carbonization to produce carbon coated $TiO_2$, which was later milled with lithium carbonate to produce LTO. The process is found to be tedious involving multistep milling and annealing and hence it may be less attractive for commercial application. Matsui et al [*J. Am. Ceram. Soc.*, 91 (2008) 1522-1527] synthesized lithium titanate using anatase $TiO_2$ of particle size around 50 nm and lithium acetate as Ti and Li precursors respectively. Unlike in the present invention in which milled powders annealed at once to achieve the desire properties, two step annealing process and carbon coating was carried out in the reported study to produce single phase lithium titanate with improved electronic conductivity. Wang et al [*J. Appl. Electrochem* 40 (2010) 821-831] developed a modified ball-milling-assisted green solid reaction method followed by two step annealing process to prepare $Li_4Ti_5O_{12}/C$ composite materials using lithium carbonate, anatase $TiO_2$, and activated carbon as Li, Ti and carbon precursors respectively. Further, hexane was also used as solvent for milling. Though the process employs tedious milling and annealing process to obtain phase pure lithium titanate with 10.6 wt % of carbon content, it still lacks in electrochemical performance compared to the lithium titanate according to the present invention.

Han et al [Han, et al. *Appl Phys A* 114 (2014) 925-930] reported the synthesis of $Li_4Ti_5O_{12}$ by milling method using $Li_2CO_3$ and anatase $TiO_2$ as Ti and Li precursor and studied different degree of milling to test the hypothesis that finer starting materials can result in a smaller $Li_4Ti_5O_{12}$ particle size and better high-rate discharging capacities. The degree of milling was controlled by using three different $ZrO_2$ ball sizes for high-energy milling (3 h) and 5 mm balls for planetary ball milling (24 h). The results indicated that high-energy milling produced significantly finer starting materials and $Li_4Ti_5O_u$ particles compared to those produced by ball milling. Here again usage of solvent, intermediate drying step and slow annealing procedure makes the process tedious and time consuming. [Jhan, et al reported [*Journal of Power Sources* 198 (2012) 294-297] the synthesis of LTO/multi-walled carbon nanotube (MWCNT) composite is prepared by a ball-milling-assisted solid-state reaction and concluded that LTO nanoparticles were confined in the inter space of the MWCNT matrix and MWCNT prevent the aggregation of LTO particles during the calcination process of the solid-state reaction. Further, the entanglement of the MWCNTs and LTO creates an effective conductive network, which improves the conductivity of LTO. Therefore, the entanglement structure improves the electrochemical properties of LTO, such as the rate capability and cyclic stability. In addition, Sol-gel assisted ball milling technique [Yan, et al *Journal of Alloys and Compounds* 470 (2009) 544-547] was reported to produce lithium titanate where in it was synthesized by adopting sol-gel process, ball milling and then calcination process. The overall process including wet chemical method, intermediate heating, milling and a two step annealing process seems to be complicated, time consuming and expensive process though it exhibit reasonable electrochemical performance. Mechanical alloying is a basic technique used for milling of homogenous mixture of blended precursors and was used for synthesis of various alloying materials. Particularly, high kinetic horizontal rotary or horizontal attrition milling unit is the one that used for the solid state milling of composites with realistic of scalability and used for the production of alloys like Fe—Cr, Ni—Cr or milling of high-speed steel for particle size reduction. Since horizontal attrition milling forms a kinetic energy of 2-3 times higher than that of conventional planetary ball milling, milling time less than one order of magnitude can be reflected in former system in comparison with the later system. The main processing principle of milling is to transfer energy from kinetic collision of balls (Zoz et al Simo36-Paper) to powder. The continuous collection of milled powders without any wastage and environmental friendly condition added further advantages to horizontal attrition milling.

It can be inferred that none of the patents as well as literature matches with the present invention. Most of the patents were dealt with the synthesis of LTO by wet milling in the presence of a dispersing agent and the use of additional carbon coating and external doping for improving the electrical conductivity. Further, reduced atmosphere ($H_2$+ Ar) was used for creating oxygen vacancies to produce $Ti^{3+}$ ions, which increase electrical conductivity in LTO. In contrast, in the present invention, we have adopted horizontal attrition milling, in which milling of Li and Ti (mixed phase) precursors with stearic acid which act as process control agent (PCA) as well as carbon precursor was carried out without external dopant ions, carbon precursor, and reducing atmosphere.

OBJECTIVES OF THE PRESENT INVENTION

The objectives of the invention are:
(i) To develop lithium titanate as an anode for electric vehicle applications using a simple, cost effective, energy efficient and scalable technique of commercial interest.
(ii) To design a simple synthesis process which involves only blending of precursor material and calcination to get the desired single phase highly conducting lithium titanate anode.
(iii) To optimize various synthesis parameters like milling time, annealing time, annealing atmosphere and $TiO_2$ precursor concentrations.
(iv) To develop a method for synthesis of lithium titanate anode, which works efficiently in terms of specific capacity, rate capability and cyclic stability in half/full cell configurations.

SUMMARY

Though large numbers of techniques are available for synthesis of lithium titanate, they all involve highly complicated synthesis procedures, huge amount of solvents, toxic chemicals and expensive techniques. The measures followed to overcome the disadvantages of LTO like poor electronic and ionic conductivity require the addition of one more step to the synthesis process making it more complicated and unsuitable for commercial applications. In the present invention we intent to develop a simple, economical and energy efficient scalable technique for production of LTO anode by a single step synthesis process-solid state method using $TiO_2$ and $Li_2CO_3$ as precursor for Ti and Li respectively. Though synthesis of LTO from $TiO_2$ and $Li_2CO_3$ reported previously by planetary ball milling, horizontal attrition milling process the most reliable technique for up-scaling without affecting the cost has been adopted by us for the first time to synthesize LTO. According to prior patent art and published literatures, many method of synthesis involves a two-step procedure wherein initially synthesis of LTO is carried out and later ex-situ carbon coating is done. Whereas in the instant invention, we have developed a single step process in which, the synthesis of LTO and carbon coating carried out simultaneously. The stearic acid used in the present invention plays a dual role, one as process controlling agent (PCA) to avoid stacking powders during milling and other as carbon precursor which is an added advantage compared to other technique. Further, it also helps to produce oxygen vacancies which can improve the electronic conductivity. The method followed here provides the ease of up scaling. This method ensures high cost effectiveness as the precursors used and the equipment handled is highly cost effective. Accordingly, a method of producing high performance lithium titanate anode using horizontal attrition milling process is disclosed here comprising the following features:

TiO$_2$ (anatase or rutile or anatase and rutile) and Li$_2$CO$_3$ are used as titanium and lithium precursors respectively.

Different crystal phases of TiO$_2$'s such as anatase (100%), rutile (100%), mixed phases (anatase 60-80% & rutile 20-40%) were used to optimize the suitable titanium precursors required for the synthesis of lithium titanate. The resulting lithium titanate from 100% anatase, 100% rutile, 60% anatase & 40% rutile, and 80% anatase & 20% rutile TiO$_2$ is referred as A-LTO, R-LTO, M1-LTO and M2-LTO respectively.

Lithium carbonate and titanium precursors were milled in horizontal attrition milling unit for a period of 0.5-2 hrs to blend them properly and to reduce the particle size.

Ball to powder ratio was maintained as 1:12 employing stainless steel vials as milling medium with 0.5-1 mm dia. stainless steel balls. A PCA is used to prevent the stacking of powders. Here 2-5 wt. % of stearic acid is used as PCA which then acts as carbon source also.

Blending of above mixture was carried out at a speed of 250 rpm and milling was done at 250-500 rpm for 0.5-2 hrs.

Milled powders are discharged and stored for annealing and characterization.

Annealing temperature and annealing time were optimized. Powders were pelletized using a 30-35 mm die with a pressure of 0.5-1 ton using a hydraulic press. When in pellet form, it ensures proper inter-particle contact and more heat transfer making annealing uniform throughout.

Annealing was carried out in argon or nitrogen or air atmosphere in tubular furnace.

Annealed powders were collected and grinded to fine powder and stored. On characterization of the resultant powders as anode material for Li-ion battery application, it was found to give excellent electrochemical performance in terms of high specific capacity, high rate capability and good cyclic stability.

A method of producing high performance nano sized lithium titanate powders for making the anode for lithium ion battery, using horizontal attrition milling according to our invention comprising the steps of: a) mixing of mixed phase having 60-80% anatase and 20-40% rutile of TiO$_2$ as titanium precursor with Li$_2$CO$_3$ as lithium precursor in a stoichiometric ratio of 5:4 with 5 wt % of extra Lithium carbonate to compensate the lithium loss during heat treatment; b) adding 2 to 5% stearic acid which plays as process control agent as well as carbon precursor to the above mixture; c) milling in a horizontal attrition milling unit maintained with the ball to powder ratio of 10:1-12:1 at a speed of 250-500 rpm for 0.5-2 hrs; d) repeating the process of milling with the parameters mentioned in step c) for a period ranging from 40 to 48 times in a pattern by increase and decreasing the speed for a period of 0.5 to 2 hrs; e) discharging the milled powders from horizontal attrition milling unit on completion of milling and storing them for annealing in dry form; f) pelletizing the milled powder using a 30-35 mm die at a pressure of 0.5-1 ton using a hydraulic press to ensure proper inter-particle contact, more heat transfer, and thus making the process of annealing uniform throughout; g) annealing of the composite milled and pelletized powder under inert atmosphere of argon in a tubular furnace maintained at a temperature ranging from 700-900° C. with a heating rate of 10° C./min for a period of 2-12 hrs; and h) grinding the annealed pellets to a fine powder and validate its efficiency as anode material in half/full cell configuration for lithium ion battery application.

In a preferred embodiment under the invention, Li$_4$Ti$_5$O$_{12}$ is produced by Horizontal attrition milling using TiO$_2$ and Li$_2$CO$_3$ as precursor for Ti and Li respectively. TiO$_2$ used here is very much cost effective which reduces the production cost. Cost effectiveness of TiO$_2$ precursor, no intermediate drying process, high loading of powder per batch and less milling time make our invention more attractive for commercial application. The carbon present in LTO produces a reductive atmosphere in the presence of argon and creates oxygen vacancies. One oxygen vacancies resulting two electrons and for charge compensation transfer of one electron to adjacent Ti$^{4+}$ in the lattice of LTO leads to the formation of Ti$^{3+}$. This role of oxygen vacancies are expected to improve the electronic conductivity. Presence of Ti$^{3+}$ ions are interpreted from XPS analysis and also from physical color change of samples from white to blue. FE-SEM was done to find out the particle size and was seen that M2-LTO with higher atomic concentration of Ti$^{3+}$ ions produces smaller particles size of around 250-900 nm. Smaller the particle size, smaller is the lithium ion diffusion path length, therefore increasing the electrochemical performance. HR-TEM analysis showed the presence of thin layer of carbon and highly crystalline LTO particles which showed well defined fringes with morphology similar to that of FESEM analysis.

BRIEF DESCRIPTION OF THE DRAWINGS

Other features and advantages of the present invention should become apparent from the following description of the preferred process and read in conjunction with the accompanying drawings, which illustrate, by way of example, the principles of the invention.

FIG. 6A: HR-TEM image of M2-LTO.

FIG. 11 B: Full cell studies-charge-discharge profiles at C/5 rate.

FIG. 11 C: Full cell studies-capacity retention at C/5 rate.

FIG. 11 D: Full cell studies-charge-discharge profiles at 1 C rate, and

FIG. 11 E: Full cell studies-long term stability at 1 C rate of LFP-LTO 2032 coin cell.

DETAILED DESCRIPTION OF THE INVENTION

Figure 1:
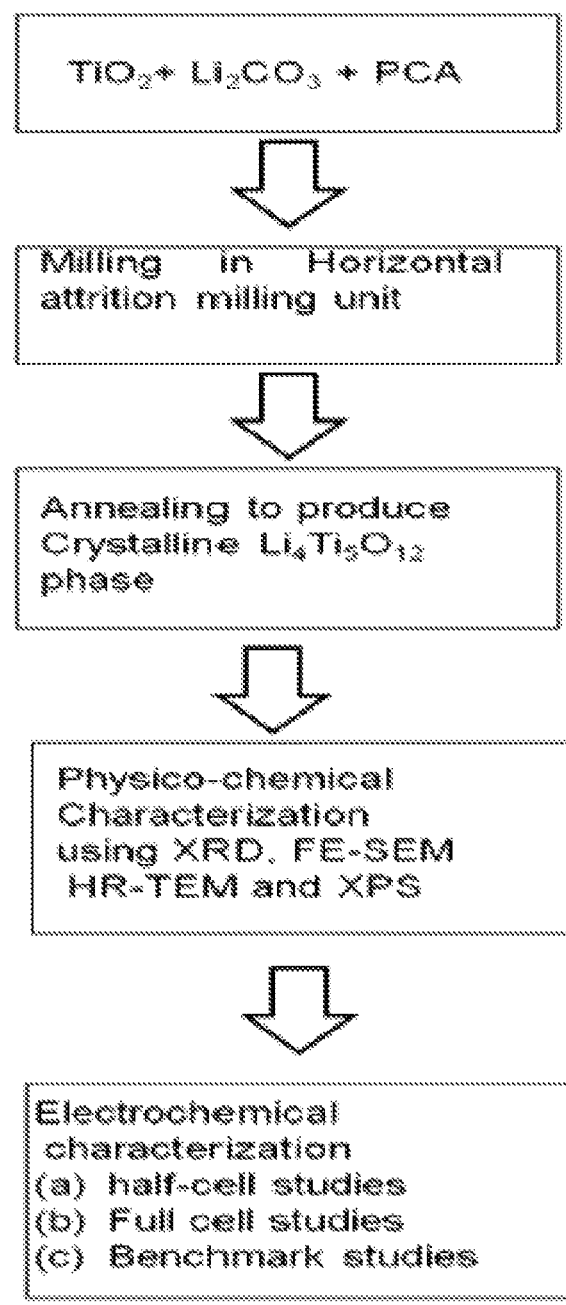
FIG. 1: Flow chart showing the synthesis of lithium titanate by horizontal attrition milling.
Figure 2A:
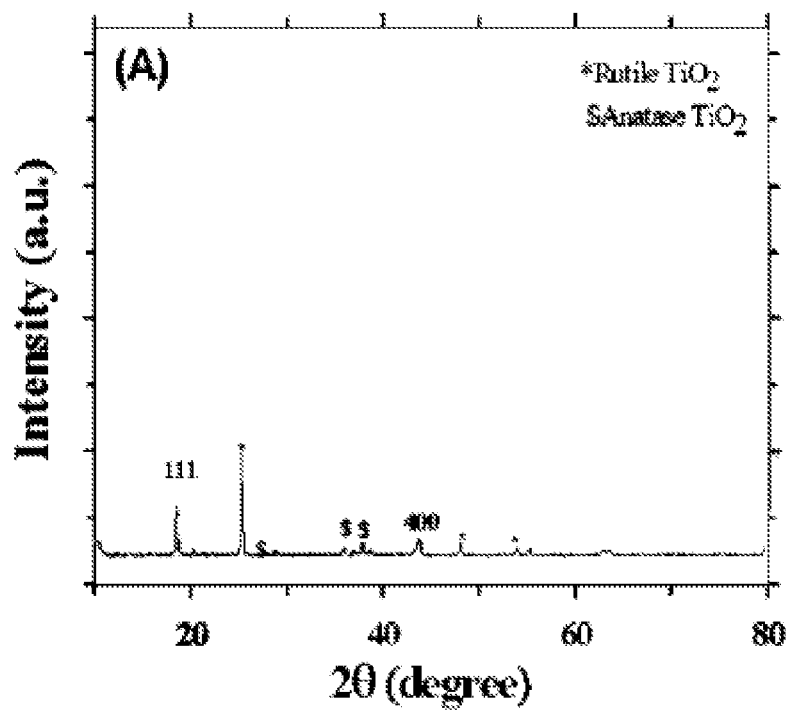
FIG. 2A: X-ray diffraction pattern of A-LTO synthesized from anatase TiO$_2$ as TiO$_2$ precursor.
Figure 2B:
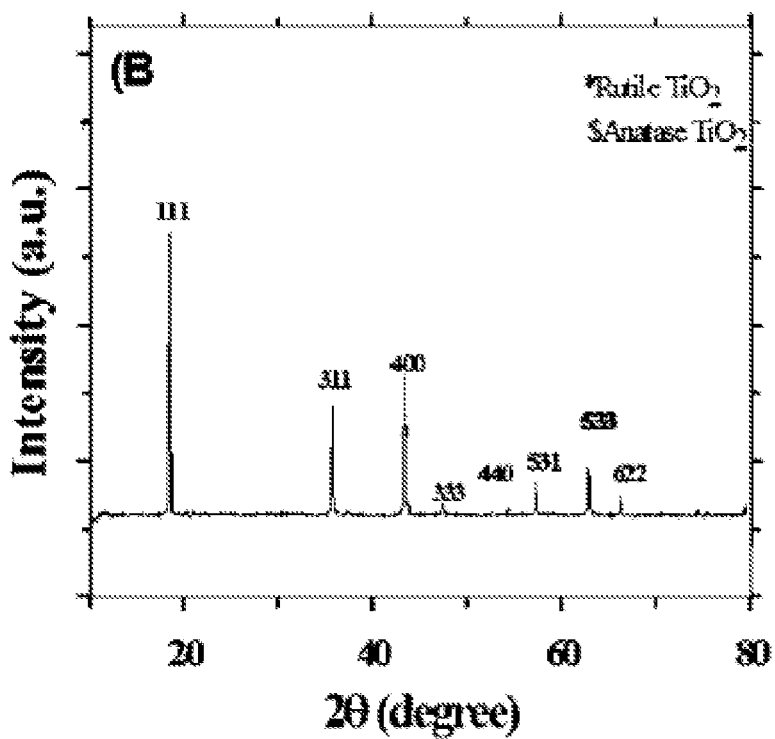
FIG. 2B: X-ray diffraction pattern of R-LTO synthesized from rutile TiO$_2$ as TiO$_2$ precursor.
Figure 2C:
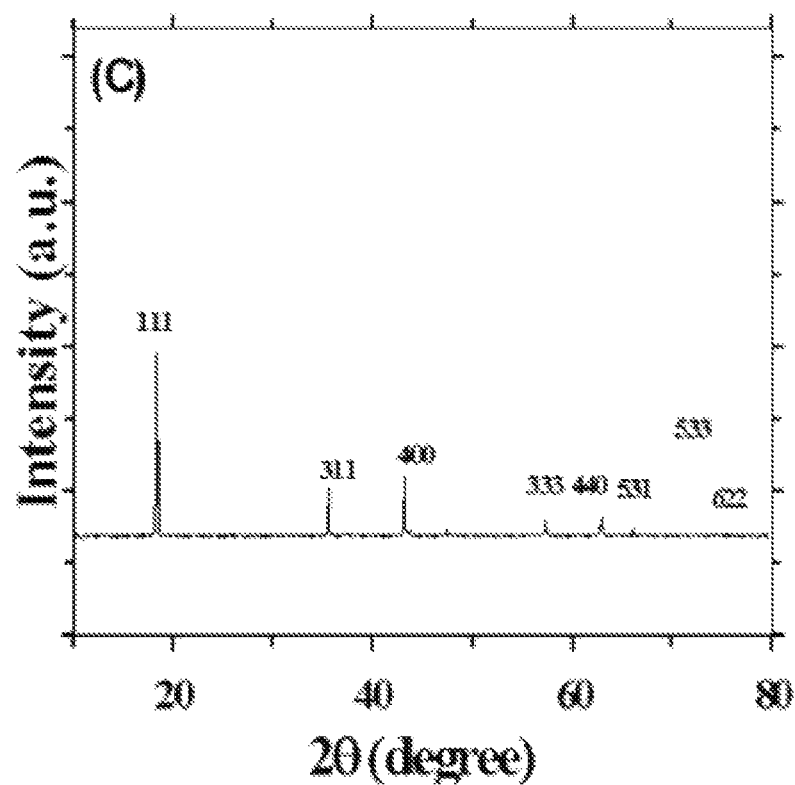
FIG. 2C: X-ray diffraction pattern of M1-LTO synthesized from mixed phases of anatase (60%) and rutile TiO$_2$ (40%) as TiO$_2$ precursor.
Figure 2D:
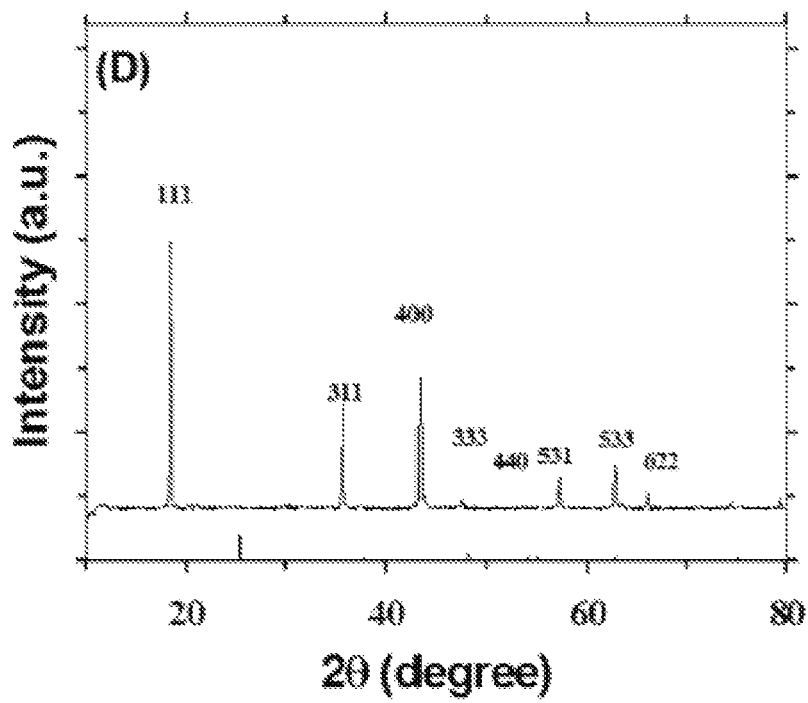
FIG. 2D: X-ray diffraction pattern of M2-LTO synthesized from mixed phases of anatase (80%) and rutile TiO$_2$ (20%) as TiO$_2$ precursor.

In accordance with the invention, high performance lithium titanate anode having excellent electrochemical characteristics are developed using $TiO_2$ and $Li_2CO_3$ precursors by a simple, economical and scalable Horizontal attrition milling technique to achieve highly conducting lithium titanate. The preferred embodiments of the process under the invention with particular reference to the drawings are as follows.

Lithium titanate as an efficient anode for high energy density lithium ion battery application, according to the invention is synthesized by a simple, facile, fast, and economical and energy efficient Horizontal attrition milling technique. According to the invention, suitable Ti precursor is used without further purification or treatment. For synthesis of LTO, $TiO_2$ and $Li_2CO_3$ in the stoichiometry ratio of 5:4 with 5 wt % of extra Lithium carbonate to compensate the lithium loss during heat treatment are transferred to the stainless steel horizontal vial of attrition milling unit. Stainless steel ball used as grinding media and with the ball to powder ratio of 10:1-12:1 was used for milling. Milling was carried out for a period of 0.5-2 hrs with appropriate acceleration and deceleration. Speed of milling was controlled between 250-500 rpm, which will avoid raise in temperature and thereby damage of the instrument. The capacity of milling vials is about 500-2500 g per run, which makes it attractive for large-scale production. Stearic acid was added as the process control agent to avoid stacking and the powders after milling were collected in the form of dry powders and stored properly.

The milled powders were then annealed to produce single-phase lithium titanate anode. Prior literatures have reported that temperatures above 750° C. results in the formation of crystalline lithium titanate. In the prior works argon atmosphere with mixed phases of hydrogen, nitrogen and air was used for annealing of lithium titanate. Mixed gas atmosphere is reported to create oxygen vacancies in the lithium titanate anode producing $Ti^{3+}$ concentration. $Ti^{3+}$ vacancies due to its more electron concentration improve the intrinsic electronic conductivity of lithium titanate.

According to the instant invention, LTO was synthesized using non-toxic, eco-friendly, cheap $TiO_2$ precursors which were available commercially and was used without further purification. Horizontal attrition milling technique used in this embodiment of the invention enables proper blending and uniform particle size reduction of $TiO_2$. Due to its high energy produced, it ensures less milling time compared to conventional planetary ball milling technique. The process control agent, which becomes a default additive for milling process here acts as a carbon source and helps to create oxygen vacancies and therefore improves the electronic conductivity of the material. This technique thus enables us to produce an efficient anode material lithium titanate, which can be very much suitable for high energy density lithium ion battery application.

Another embodiment of the invention is the presence of $Ti^{3+}$ ions and oxygen vacancies created during annealing process under argon atmosphere. Milled lithium titanate precursors are pelletized using 30-35 mm die at a pressure of 0.5-1 ton and this ensures proper inter-particle contact. This makes proper crystallization of the bulk powders. The PCA present along with argon gas creates oxygen vacancies and therefore for charge compensation, $Ti^{4+}$ ions are converted to $Ti^{3+}$ ions.

The above embodiment of the present investigation facilitates formation of $Ti^{3+}$ ion rich lithium titanate by a simple and economical Horizontal attrition milling technique. Lithium titanate synthesized under optimized condition of Ti precursors and annealing condition exhibit excellent electrochemical performance in terms of rate capability and cyclic stability showing its better role as a promising material in lithium ion batteries.

Having described the process of the invention in a general way, now we will further illustrate the mode of execution and demonstrate the characteristics/properties of LTO according to the process under the invention and also its electrochemical properties with the help of the following examples. The present invention is, however, not limited to these examples and various embodiments are possible within the scope thereof.

Example 1

Effect of Different Crystalline Phases of $TiO_2$ $Li_4Ti_5O_{12}$ was synthesised using horizontal attrition milling process. The invention produces LTO using four different phases of $TiO_2$. It uses pure anatase phase, rutile phase, Mixed phase 1 (60% Anatase and 40% Rutile) and Mixed phase two (80% Anatase and 20% Rutile) accordingly the respective LTO phases are labelled as A-LTO, R-LTO, M1-LTO and M2-LTO. The technique makes use of milling the raw $TiO_2$ powders with $Li_2CO_3$ in a stochiometric ratio of 5:4 with 5 wt % of extra Lithium carbonate to compensate the lithium loss during heat treatment. For horizontal attrition milling powder ratio was maintained to be 10:1-12:1 with stainless steel as milling medium and stainless steel balls of 0.5 mm diameter. Process control agent (PCA) was used to prevent stacking of the powders to the walls of the vials. Here stearic acid was used as PCA. It was used to 2-5 wt % as it may contribute to the carbon content as well. The powders were initially blended at 250 rpm followed by milling at a speed between 250-500 rpm. This process was continued for 48 repetitions after which the powders were discharge and then stored for annealing and characterization. The schematic illustration for the synthesis of lithium titanate in the present invention is shown in FIG. 1.

Example 2

Influence of Annealing Atmosphere and Time

Figures 3A, 3B, 3C, 3D:
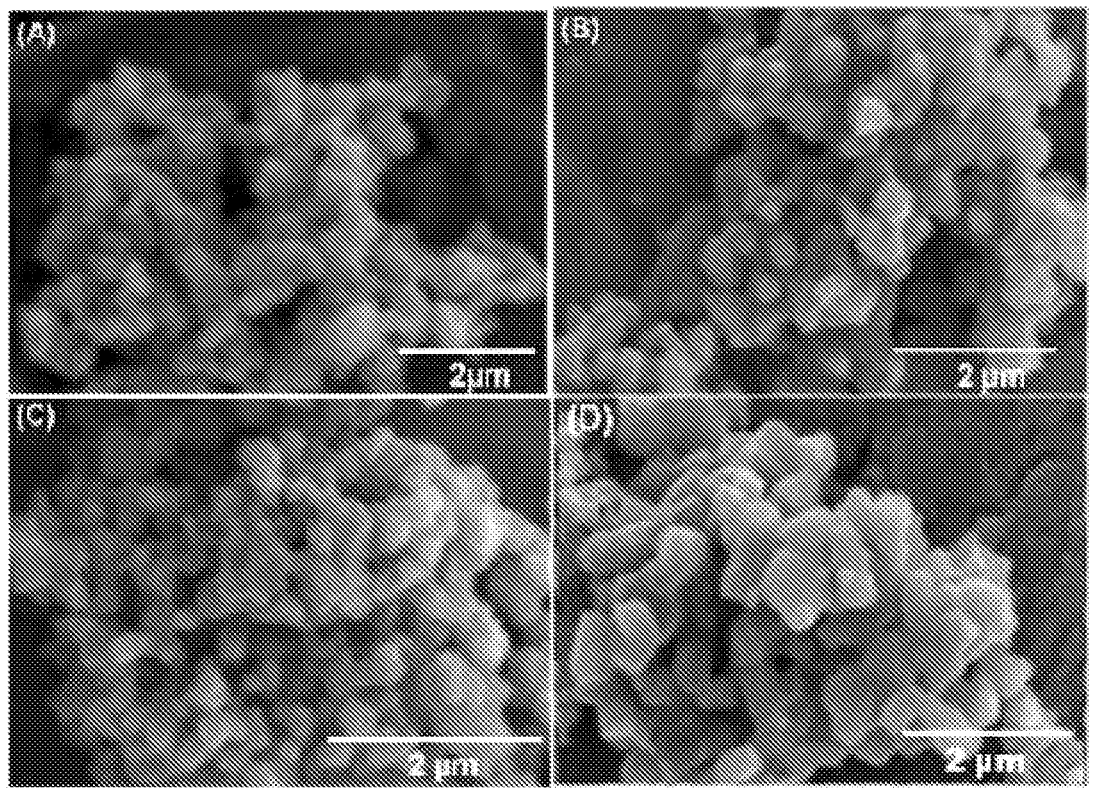
FIG. 3A: FE-SEM image of A-LTO.
FIG. 3B: FE-SEM image of R-LTO.
FIG. 3C: FE-SEM image of M1-LTO.
FIG. 3D: FE-SEM image of M2-LTO.
Figure 4A:
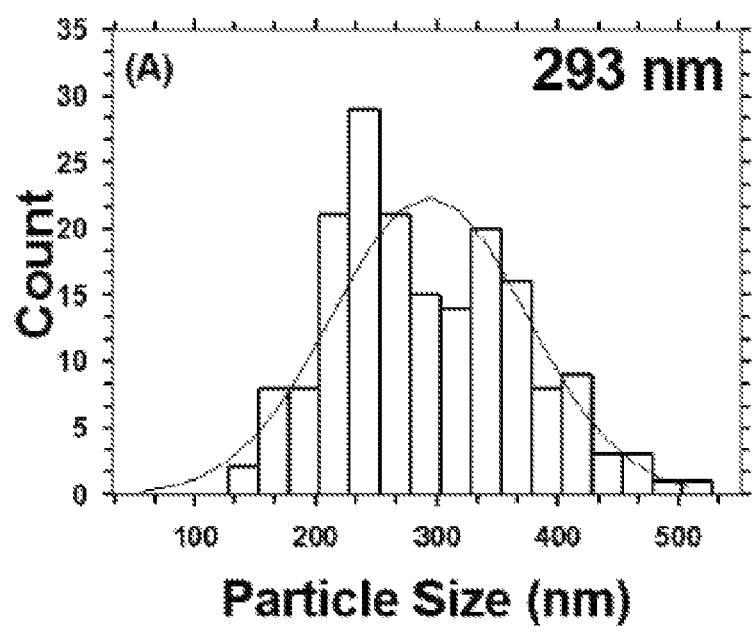
FIG. 4A: Average particle size distribution of A-LTO calculated using histogram.
Figure 4B:
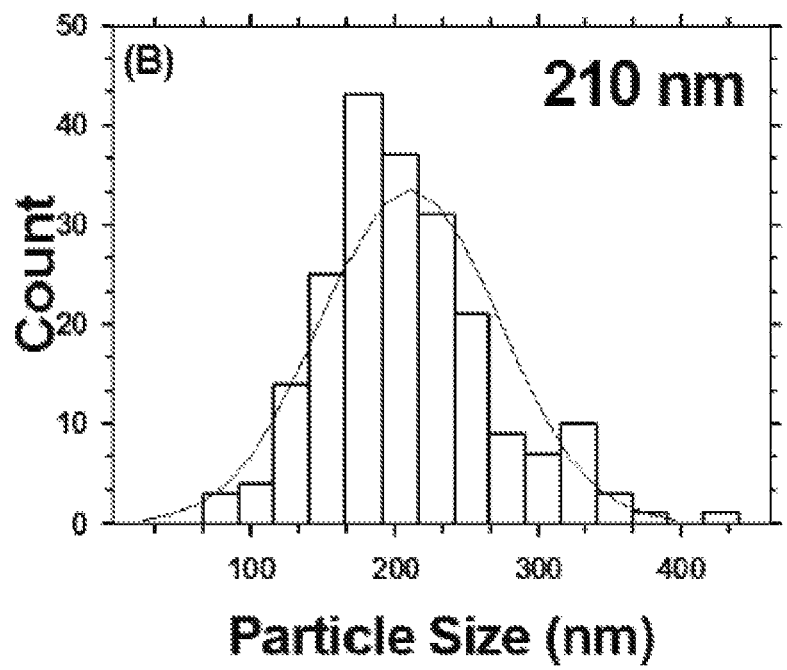
FIG. 4B: Average particle size distribution of R-LTO calculated using histogram.
Figure 4C:
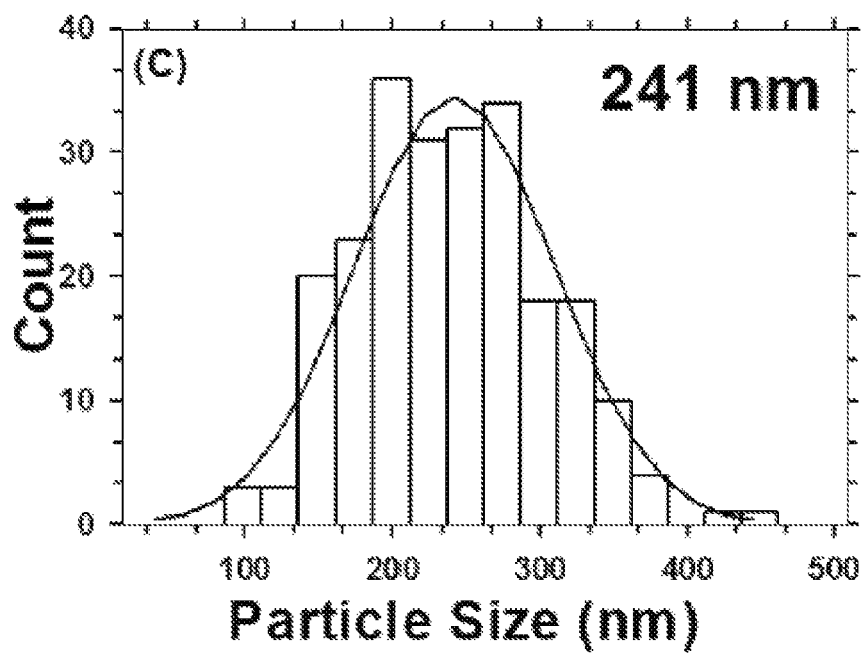
FIG. 4C: Average particle size distribution of M1-LTO calculated using histogram.
Figure 4D:
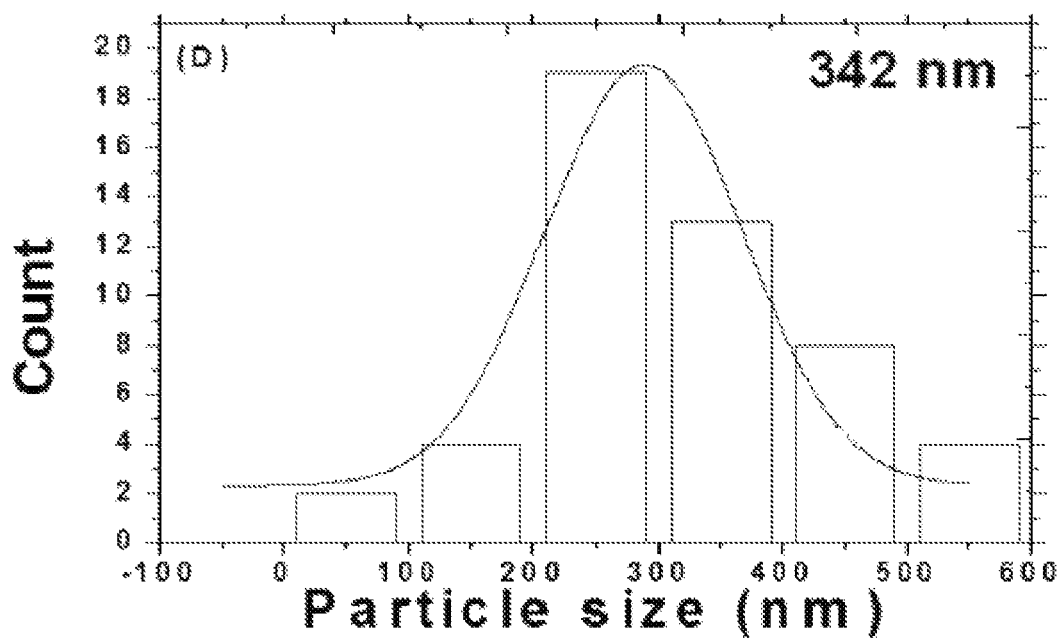
FIG. 4D: Average particle size distribution of M2-LTO calculated using histogram.
Figure 5:
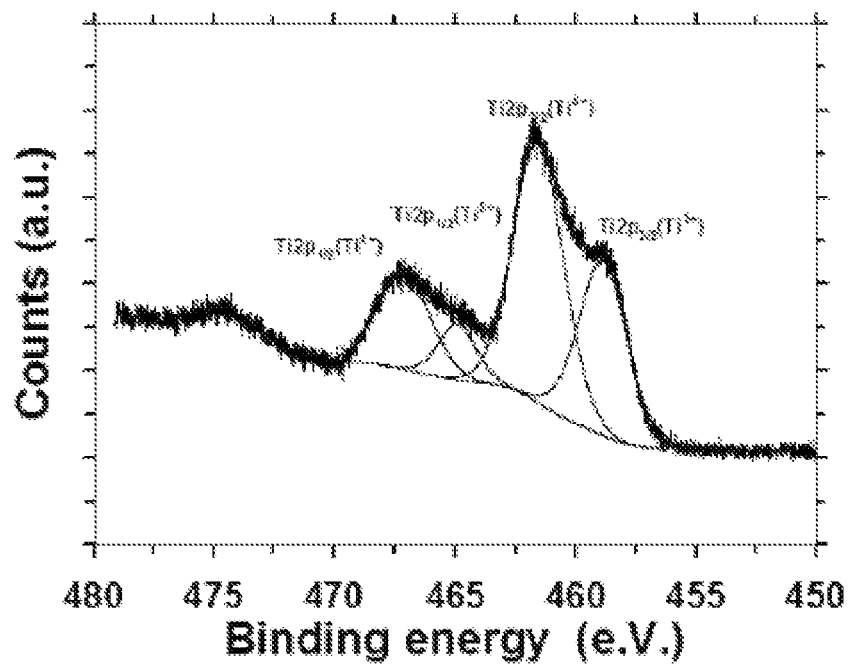
FIG. 5: XPS spectra of M2-LTO.
Figures 6, 6B, 6C, 6D:
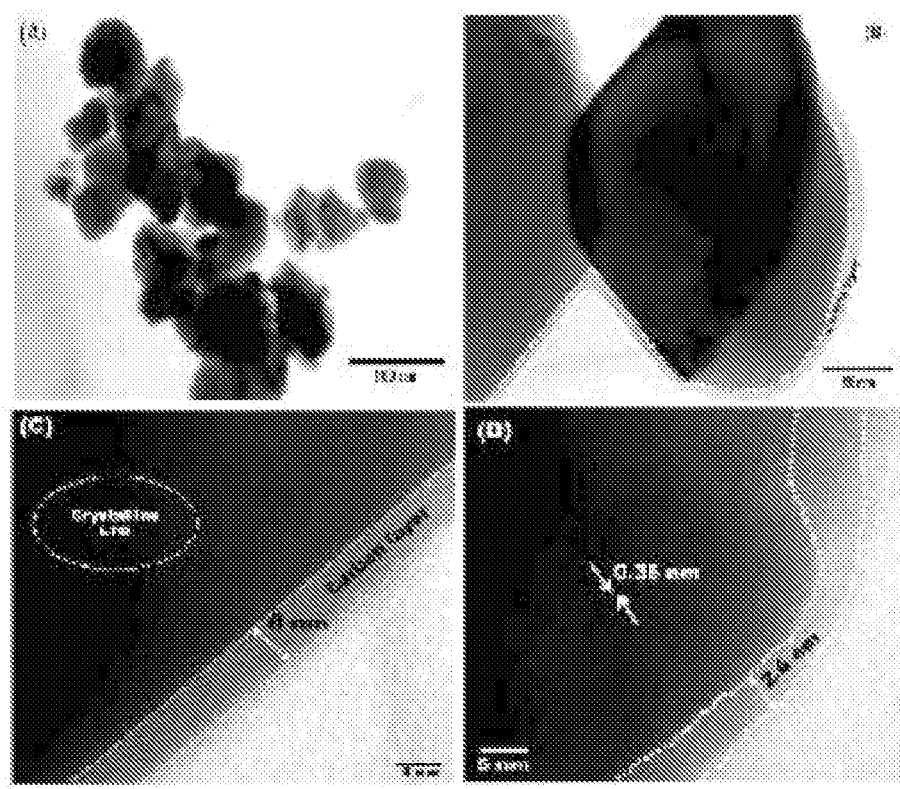
FIG. 6B-6D: HR-TEM image of M2-LTO showing the crystallinity along with carbon coating thickness.

The product of example 1 is calcined to produce highly crystalline single phase LTO. Annealing was carried out under argon, nitrogen and air atmosphere. The powders were pelletized using a 30-35 mm die under 0.5-1 ton pressure using a hydraulic press. When in pellet form it is expected to exert uniform heat distribution by improved inter-particle contact. In inert gas atmosphere, purging was carried out using the respective gas to ensure oxygen is completely expelled. Heat treatment was carried out at 700-900° C. with a heating rate of 10° C./min. In the presence of inert atmosphere, carbon from PCA creates a reductive atmosphere to produce oxygen vacancies. When these oxygen-vacancies are created, the charge compensation is done by titanium ion in oxidation state of four. To find the influence of annealing time, annealing was carried out for different time lapses like 2-12 h. All the anatase $TiO_2$ will be converted to rutile above 650° C. and then lithium diffusion into the lattice takes place. Lithium titanate formation takes place above 750° C. In the presence of inert atmosphere, carbon from stearic acid aids as carbon source creating uniform carbon layer to improve the electronic conductivity and also restricts the grain growth. X-ray diffraction studies were carried out to find the phase formation and crystallinity of the material developed using the invented method and is shown in FIG. 2(A-D). The XRD pattern of sample synthesized from A-LTO (FIG. 2A) did not result in single phase lithium titanate. The conversion was found to be incomplete where 111 plane of LTO was produced with high intensity but with traces of anatase and rutile forming the major contributors. It is seen that for R-LTO (FIG. 2B) there exists some traces of anatase and rutile $TiO_2$ (in agreement with ICDD=00-021-1272 {Anatase} and #00-021-1276 {Rutile}) which otherwise matches with LTO in all means. LTO from mixed phases of $TiO_2$ is found to match with LTO (in agreement with ICDD: #00-049-0207) and show high crystallinity however, the intensity count varies which may vary the degree of crystallinity within each samples. LTO synthesized using mixed phase precursors (FIG. 2C and FIG. 2D) shows diffraction peaks at $\theta$=18.39, 35.57, 43.24, 57.21, 62.83, 66.07 which can be indexed to phase of pure lithium titanate respectively, (in agreement with ICDD #00-049-0207). The sharp peaks indicate that the LTO formed is crystalline. Such a pure phase with high order crystallinity may help to improve the battery properties of the developed anode material. The size and morphology of the materials were evaluated by field emission scanning electron microscopy and the results are depicted in FIG. 3(A-C). Smaller the particle size shorter is the lithium ion diffusion length. A-LTO (FIG. 3A) showed larger irregular particle size distribution with non-uniform particles. Whereas, R-LTO in FIG. 3B showing particles without high agglomeration, and particles with more or less uniform size distribution. M1-LTO (FIG. 3C) showed agglomerated particles with tetragonal morphology with smaller particle size compared to A-LTO. Finally, M2-LTO (FIG. 3D) shows moderate particle size with particles distributed evenly throughout without any agglomeration. Particle size always influences the electrochemical properties. Hence, the particle size analyses were done using Image J software and then average particle size is plotted using a histogram {FIG. 4(A-D)}. The average particle sizes were calculated to be 200-500, 200-450, 190-360 and 200-750 nm for A-LTO (FIG. 4A), R-LTO (FIG. 4B), M1-LTO (FIG. 4C) and M2-LTO (FIG. 4D) respectively. M2-LTO (FIG. 4D) though has larger particle size than LTO from other three conditions, it is expected that the moderate particle size may avoid unwanted side reactions with electrolyte which may result in capacity fading and therefore is expected to perform better in terms of electrochemical studies. XPS analysis was carried out to find the oxidation state and the corresponding wide scan spectrum of Ti is shown in FIG. 5. The wide scan spectrum of titanium shows $Ti^{3+}$ peaks. M2-LTO show the presence of $Ti^{3+}$ and $Ti^{4+}$ oxidation states of Ti comprising 70% of $Ti^{4+}$ ions and 30% of $Ti^{3+}$ ions. The presence of $Ti^{3+}$ ions were also physically interpreted from the colour change observed after annealing. Generally, LTO has the physical characteristic showing white in colour. However, in the present inventions the powders changed to bluish-ash after annealing showing the presence of $Ti^{3+}$ ions. $Ti^{3+}$ ions due to its smaller ionic radii and higher electron affinity, improves the electron population to improve the electronic conductivity of the material developed using the invented synthesis technique. HR-TEM images (FIG. 6A) showed that M2-LTO with higher degree of $Ti^{3+}$ ion concentration contained cubic particles which are the characteristics of spinel LTO. It showed traces of carbon finely distributed around the edges uniformly in the form a thin layer which is from the stearic acid with thickness of around 2.5 to 8 nm {FIG. 6(B-D)}, which is expected to improve the conductivity of the anode material developed.

Example 3

Electrochemical Performance in Half Cell Configuration

Figure 7A:
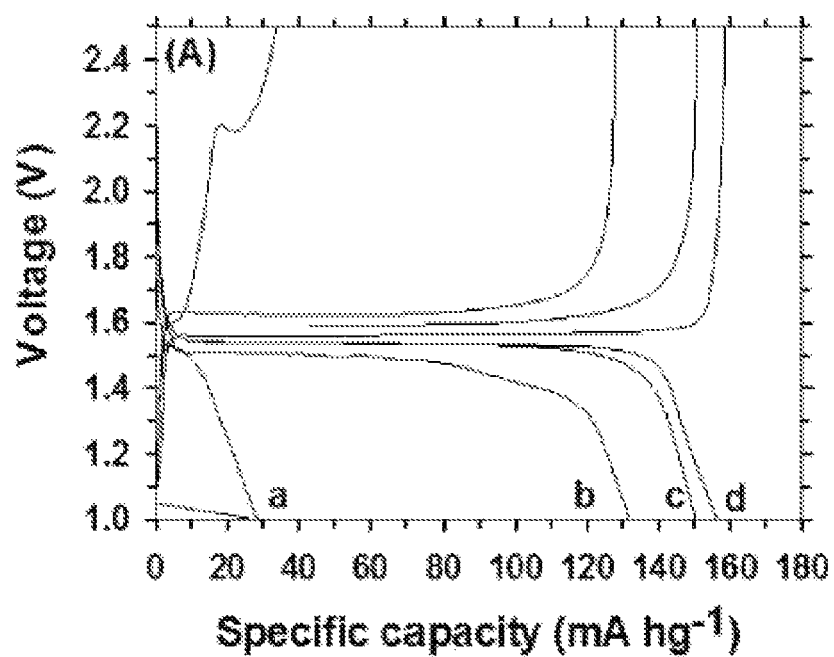
FIG. 7A: Charge-Discharge profile of A-LTO (a), R-LTO (b), M1-LTO (c) and M2-LTO (d).
Figure 7B:
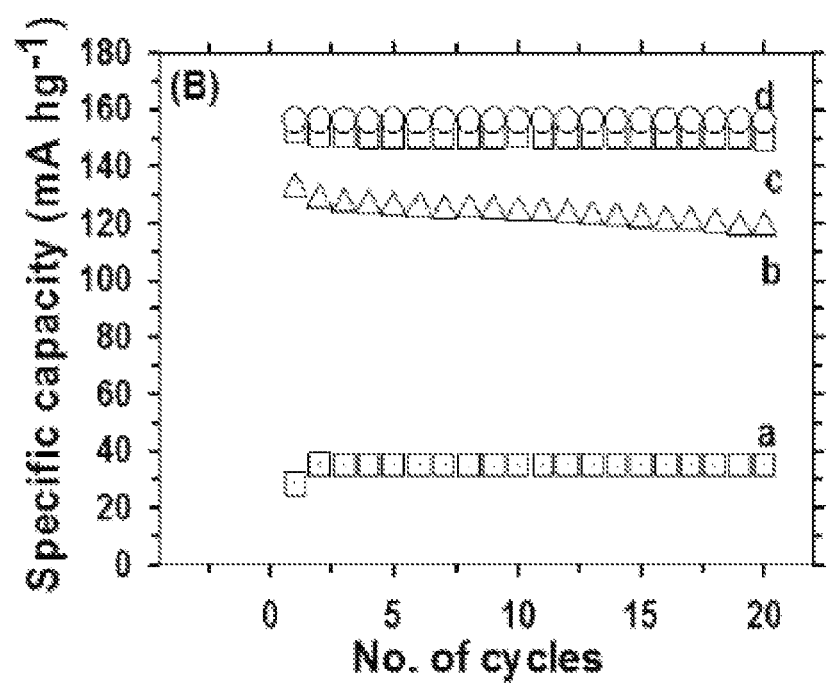
FIG. 7B: Cyclic stability of A-LTO (a), R-LTO (b), M1-LTO (c) and M2-LTO(d).
Figure 8A:
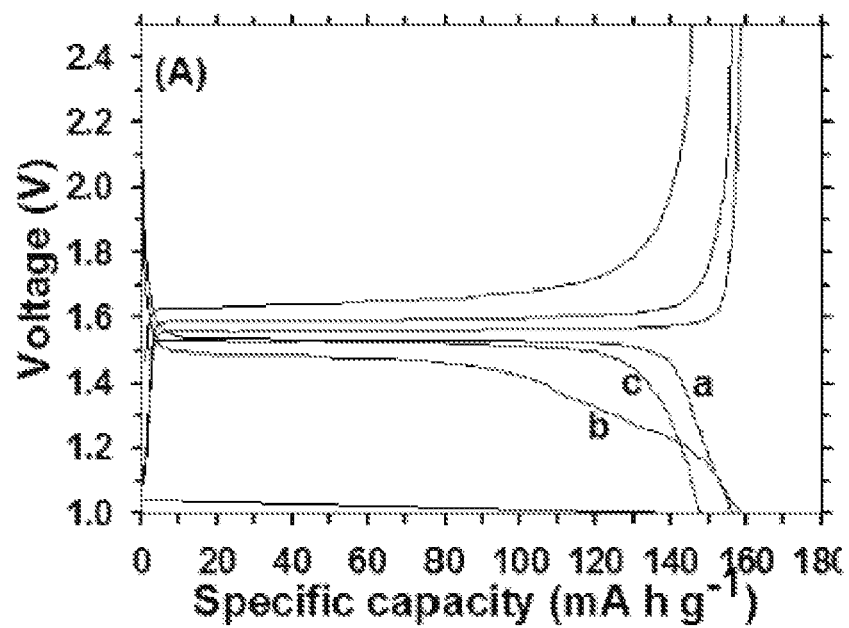
FIG. 8A: Electrochemical performance-charge discharge profile of M2-LTO annealed in Argon (a), Nitrogen (b) and Air (c).
Figure 8:
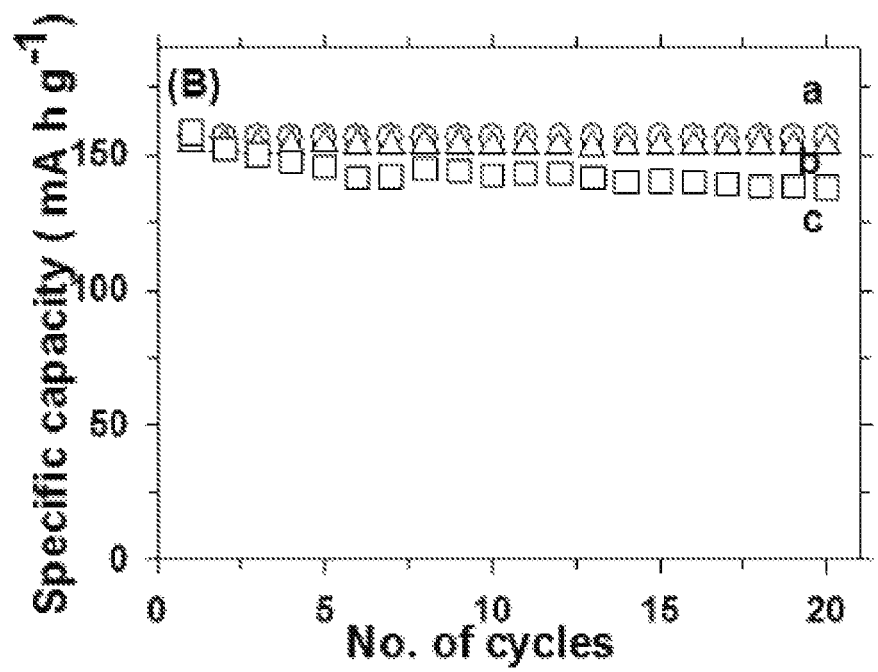
FIG. 8B: Electrochemical performance-cyclic stability of M2-LTO annealed in Argon (a), Nitrogen (b) and Air (c).
FIG. 8C: Electrochemical performance-charge discharge profile of M2-LTO annealed for 1 h (a) and 12 h (b).
FIG. 8D: Electrochemical performance-cyclic stability of M2-LTO annealed for 1 h (a) and 12 h (b).
Figure 8C:
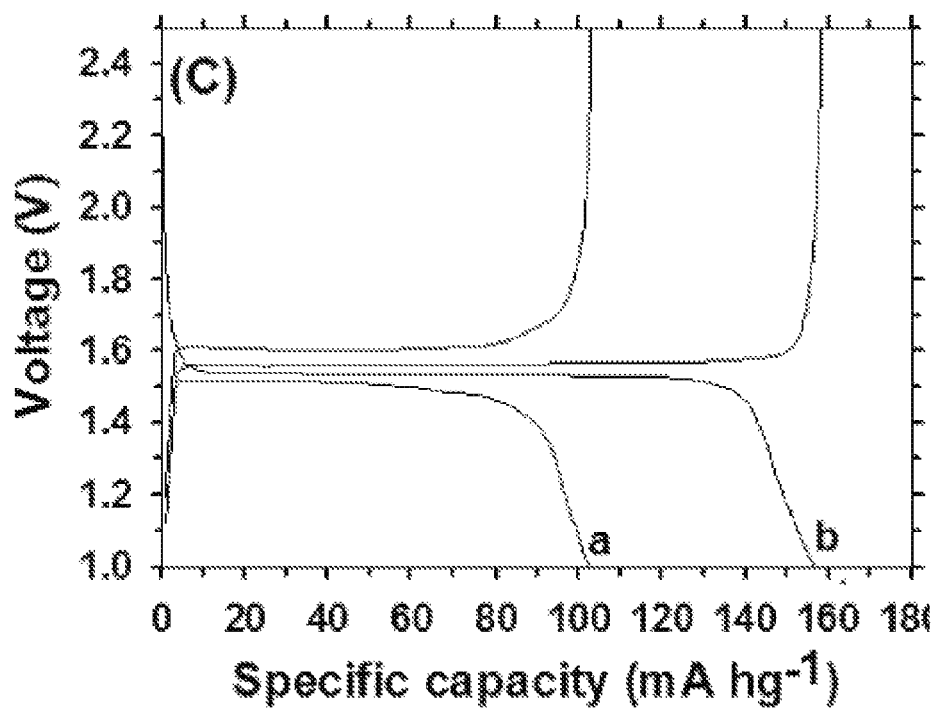
Figure 8D:
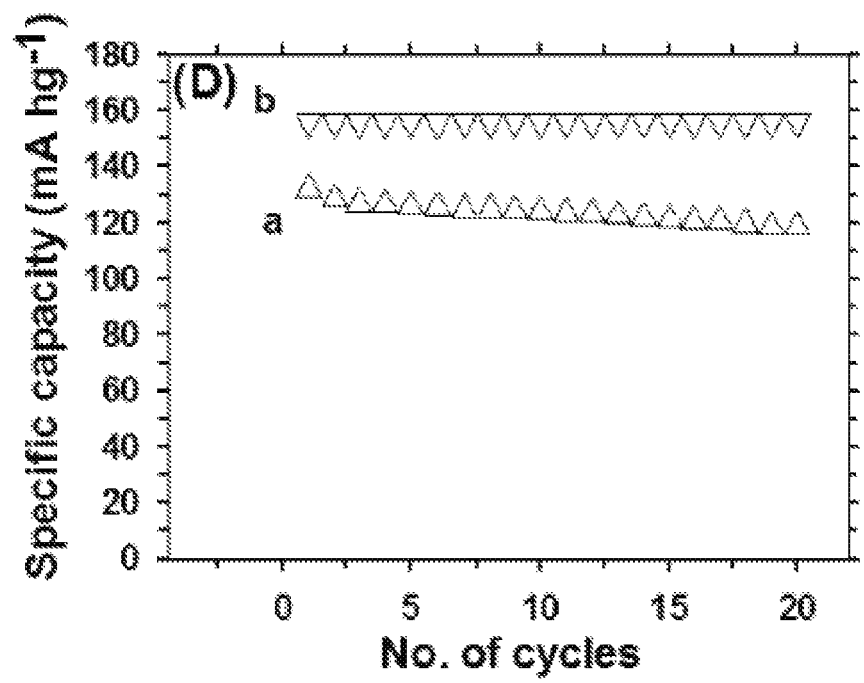
Figure 9A:
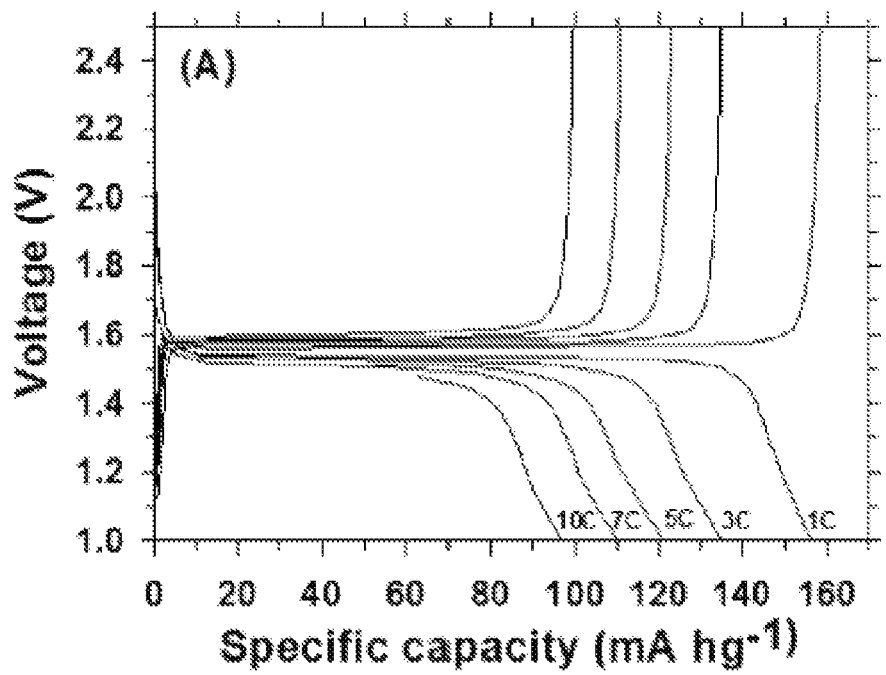
FIG. 9A: Electrochemical performance-charge discharge profile of M2-LTO carried out at different current rate of 1 C to 10 C.
Figure 9B:
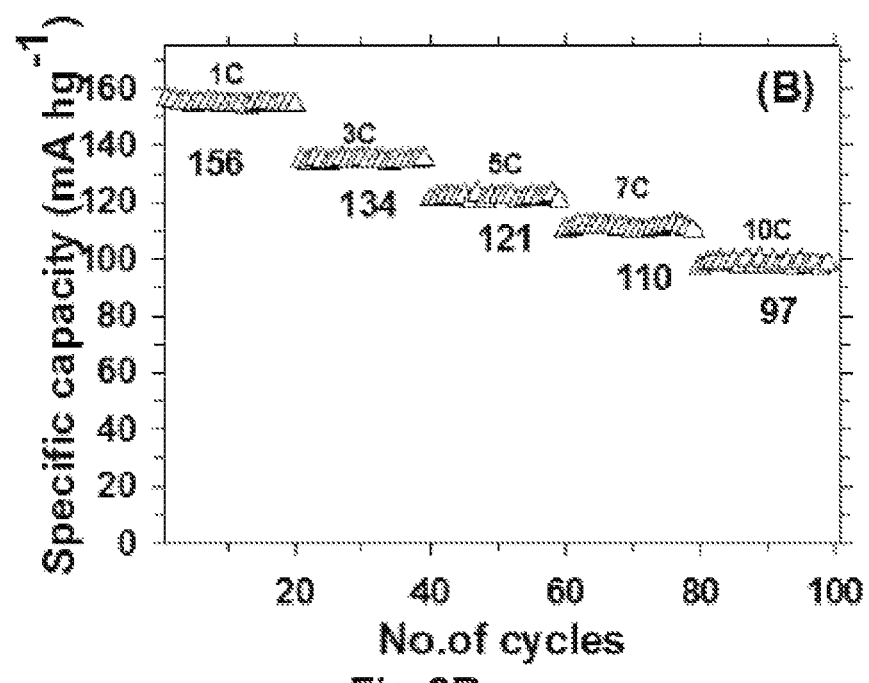
FIG. 9B: Electrochemical performance-rate capability of M2-LTO carried out at different current rate of 1 C to 10 C.

The electrochemical properties are the final target of the invented technique. The property of anode developed was tested in half-cell configuration using lithium metal as counter electrode. The crystalline anode material prepared was used for electrode fabrication to test the efficiency for electrochemical properties. For electrode fabrication, the electrode active material synthesized using horizontal attrition milling is taken along with conductive carbon and binder in a ratio of 80:10:10. They are grinded together and dissolved in NMP solvent to form homogenous slurry, which can be used for electrode fabrication. This slurry was coated over a current collector (in the present case copper foil acts as current collector) using doctor blade in a thickness of 15 micrometer. The resulting electrode is then dried at 60° C. for 12 h to evaporate the moisture and ensure the proper adherence of active material to the current collector. Then to ensure proper drying this is then dried at 120° C. for another 6 h. The efficiency of the horizontal attrition mill synthesized lithium titanate anode is tested using coin-cell to find the electrochemical performance using the electrodes fabricated using the above-mentioned process. An electrode was punched around 12 mm diameter and was weighed to find the active material weight. Lithium metal was used as the counter electrode and $LiPF_6$ as electrolyte (EC:DEC:EMC in 1:1:1 vol %). The cells were assembled in argon-filled glove box to avoid the oxidation of electrolyte and to ensure the safety of lithium metal. The cells were then kept aside for a period of 6 h for wettability and stabilization of the open circuit voltage. The as fabricated cells were then tested using MTS pro 2000 Arbin instruments to find the electrochemical properties. FIG. 7 (A-B) shows the electrochemical performance of LTO synthesized using different TiO$_2$ for optimization to find the appropriate Ti precursor. When tested at 1 C rate A-LTO (FIG. 7A-a), R-LTO (FIG. 7A-b), M1-LTO (FIG. 7A-c) and M2-LTO (FIG. 7A-d) delivered a capacity of 35 mA hg$^{-1}$, 142 mA hg$^{-1}$, 154 mA hg$^{-1}$ and 156 mA hg$^{-1}$ respectively. The cyclic stability data's of A-LTO (FIG. 7B-a), R-LTO (FIG. 7B-b), M1-LTO (FIG. 7C-c) and M2-LTO (FIG. 7D-d) also in good agreement with the results of charge-discharge profile. Here the active material loading of M2-LTO on electrode disk was around 2.3 mg/cm$^2$. Particle size distribution is correlated to the specific capacity of the anode materials mentioned above. Since the phase formation in the case of A-LTO being incomplete, it leads to the poor electrochemical performance. Even the charge discharge profile does not even resemble the signature curve of lithium titanate. Polarization resistance was very high and delivered very low electrochemical performance. R-LTO showed some impurities like anatase and rutile phases of TiO$_2$ which may degrade the electrochemical performance and then particle size were also higher increasing the lithium ion diffusion length. Increases path length with semiconducting TiO$_2$ phases may be attributed as the reasons for poor electrochemical performance. M1-LTO showed 145 mA hg$^{-1}$ which is considered to be reasonable however it was less convincing when compared to the performance of M2-LTO. M1-LTO consisted for 60% anatase TiO$_2$ and 40% rutile TiO$_2$ whereas M2-LTO consisted to 80% of anatase TiO$_2$ and 20% rutile TiO$_2$. Anatase TiO$_2$ has smaller particle size than rutile, which may increase the activity of lithium diffusion into its crystal lattice and decreases the particle size. Therefore it produced a capacity of 156 mA hg$^{-1}$ at 1 C which is close to the theoretical capacity i.e. 175 mA hg$^{-1}$. The average particle size of M1 and M2-LTO were 243 and 342 nm showing that M2 LTO with high crystallinity and moderate particle size perform better due to shorted lithium ion diffusion length and structural stability. XPS also showed an increased concentration of Ti$^{3+}$ ions in M2-LTO compared to other samples. Ti$^{3+}$ ions due to its smaller ionic radii and increased electron density improve the electronic conductivity of M2-LTO. M2 LTO was found to be efficient among all the synthesis conditions the annealing conditions were optimized using different time periods and different atmospheric conditions. When annealed under argon (FIG. 8A-a), nitrogen (FIG. 8A-b) and air (FIG. 8A-c) they delivered a capacity of 156, 154 and 147 mA hg$^{-1}$ respectively. The cyclic stability of lithium titanate which annealed under argon (FIG. 8B-a), nitrogen (FIG. 8B-b) and air (FIG. 8B-c) also reveal that argon annealed lithium titanate exhibit stable electrochemical performance. It is seen that argon being heavier than nitrogen aided in avoiding complete oxidation and helped to improve the electronic conductivity. When annealing in air, carbon which may improve the conductivity was removed with air and it is expected that there does not exists Ti$^{3+}$ ions as the samples annealed in air looked pure white in color which indicates the absence of oxygen vacancies. Charge discharge profile (FIG. 8C) annealed for 1 h (FIG. 8C-a) & 12 h (FIG. 8C-b) and cyclic stability (FIG. 8D) of M2-LTO annealed for 1 h (FIG. 8D-a) & 12 h (FIG. 8D-b) results reveal that 12 h annealed lithium titanate exhibit better electrochemical performance than 1 h annealed lithium titanate, indicating that short time annealing may not be enough for lithium titanate phase formation. A fresh half cell with LTO loading of around 3 mg/cm$^2$ was fabricated and stabilized with 6 h rest period to analyze the rate capability. Charge-discharge profile (FIG. 9A) and rate capability (FIG. 9B) results at different current rate revealed that M2-LTO delivered a capacity of 156, 134, 121, 110 and 98 mA hg$^{-1}$ at 1 C, 3 C, 5 C, 7 C and 10 C respectively. This was higher than the values reported without Ti$^{3+}$ ions and was comparable to that of other reports (Yuan et al, *J. Phys. Chem. C*, 15, (2011), 4943-4952) where only with the help of conductive additives they were able to achieve high capacities. Improved rate capability proves the efficiency to be used in high energy density applications. Polarization resistance as well as the stability was found to be supporting to make it suitable for high energy density application. This shows the material developed is highly suitable for commercial applications as it performed better in terms of rate capability and cyclic stability. The better electrochemical performance delivered by M2-LTO developed in the present study can be attributed to the presence of oxygen vacancy, carbon layer and the pure phase of lithium titanate.

Example 4

Benchmarks Studies of M2 LTO with Commercial LTO

Figure 10A:
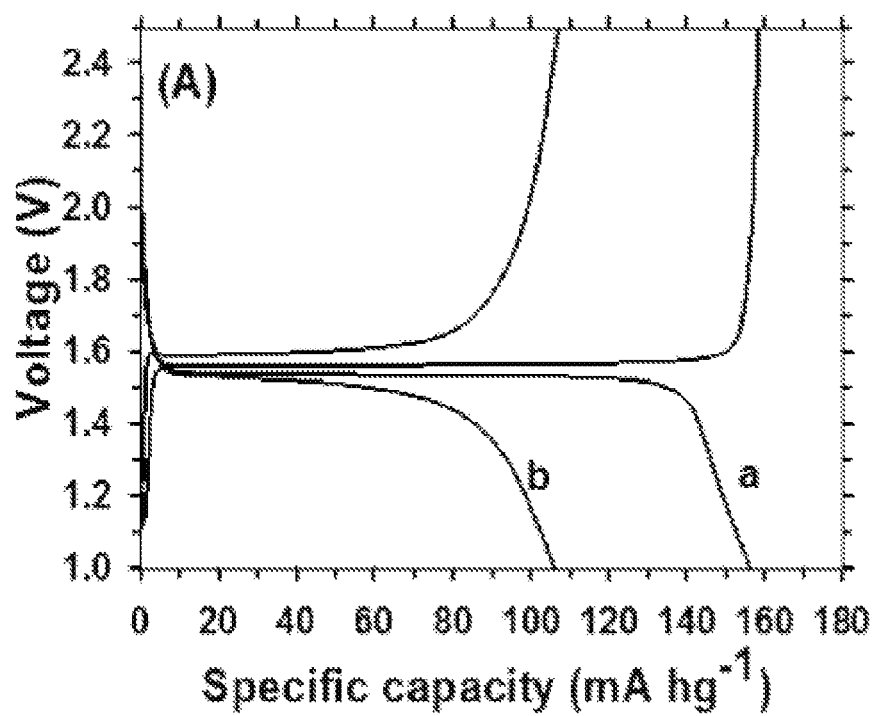
FIG. 10A: Benchmark studies-comparison of charge-discharge profile of M2-LTO (a) and commercial LTO (b) at 1 C rate.
Figure 10B:
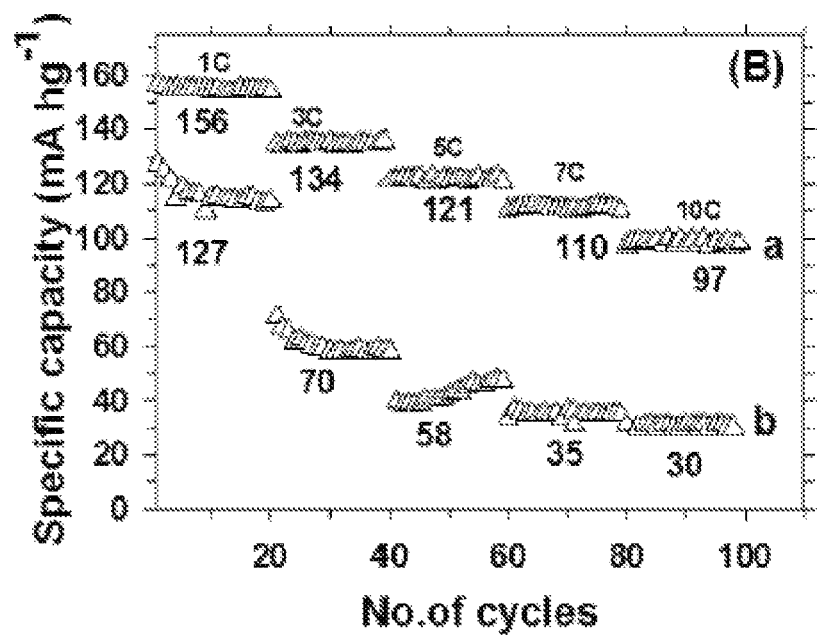
FIG. 10B: Benchmark studies-Comparison of rate capability of M2-LTO (a) and commercial LTO (b) at 1 C rate.

As M2-LTO developed in the present invention is found to be efficient in terms of electrochemical performance, benchmark studies were carried out to find the efficiency of the material for practical applications. Commercial lithium titanate powders were fabricated as thin film electrodes on copper foil using same procedure mentioned in example 3. Then it was cut to 12 mm discs to fabricate half-cell for electrochemical studies. Bench mark studies (FIG. 10A) revealed that the specific capacity of LTO (156 mAh/g) synthesized by horizontal attrition milling process (FIG. 10A-a) is higher than the specific capacity (113 mAh/g) of commercial LTO (FIG. 10A-b). The commercial lithium titanate was tested between 1 C and 10 C (FIG. 10B) to find out the rate capability and the results were compared with the performance of M2-LTO. It was seen that M2-LTO delivered a capacity of 156, 134, 121, 110 and 97 mA hg$^{-1}$ at 1 C, 3 C, 5 C, 7 C and 10 C respectively whereas commercial lithium titanate anode delivered capacity of 115, 70, 58, 35 and 30 mA hg$^{-1}$ at 1 C, 3 C, 5 C, 7 C and 10 C respectively, indicating that the electrochemical performance of lithium titanate developed in the present invention is superior than commercial lithium titanate.

Example 5

Electrochemical Performance in Full Cell Configuration

Figure 11:
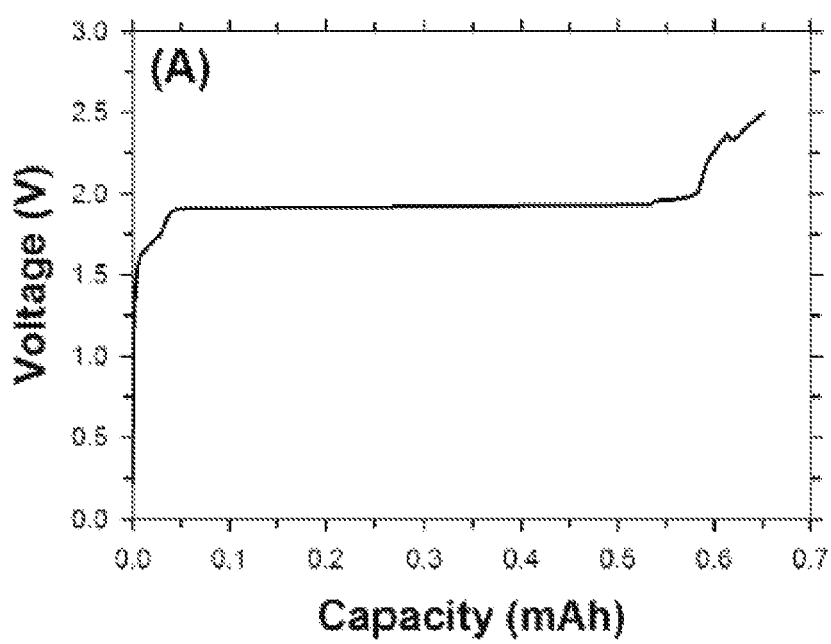
FIG. 11 A: Full cell studies-Formation cycle at C/10.
Figure 11B:
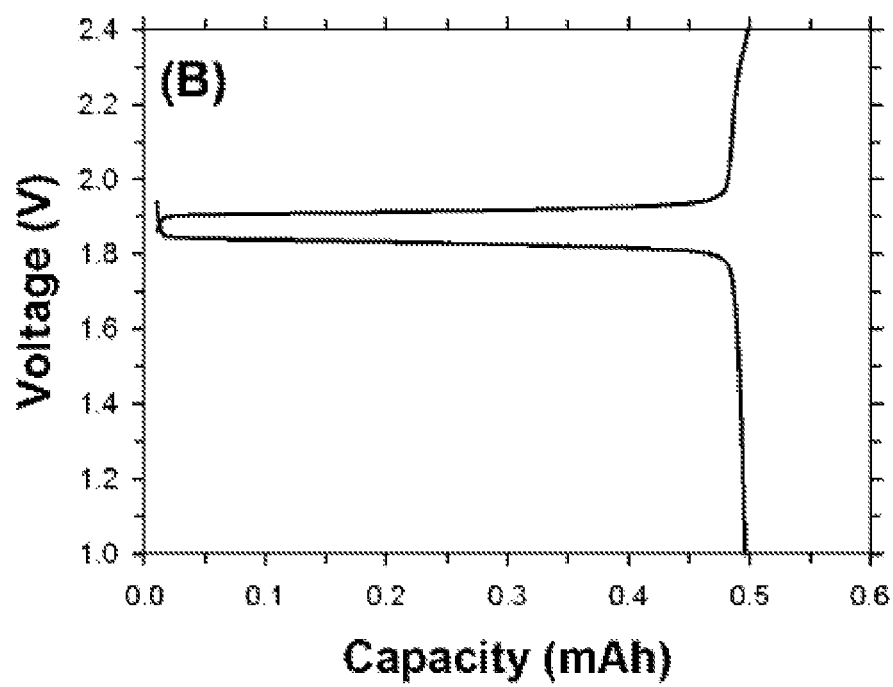
Figure 11C:
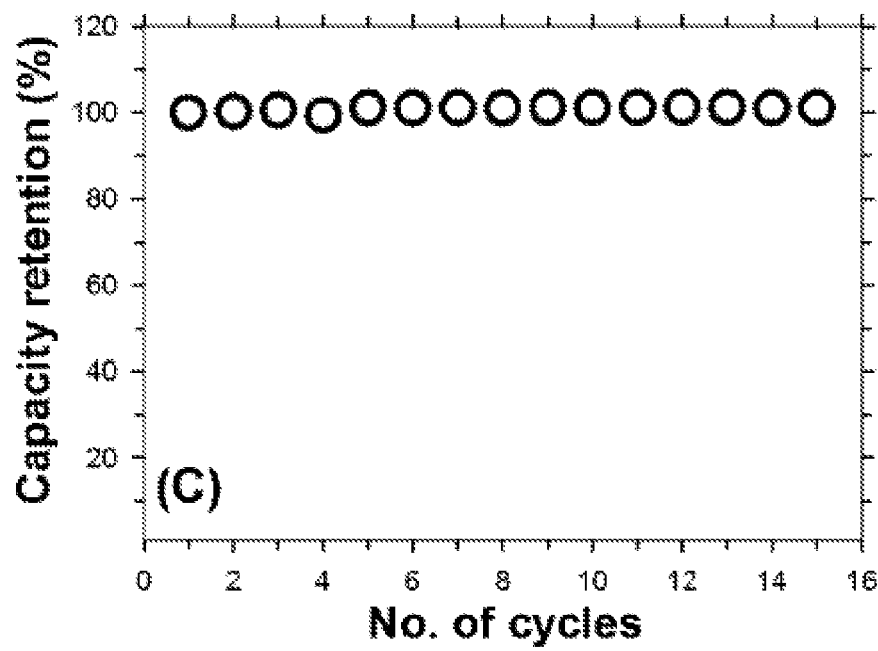
Figure 11D:
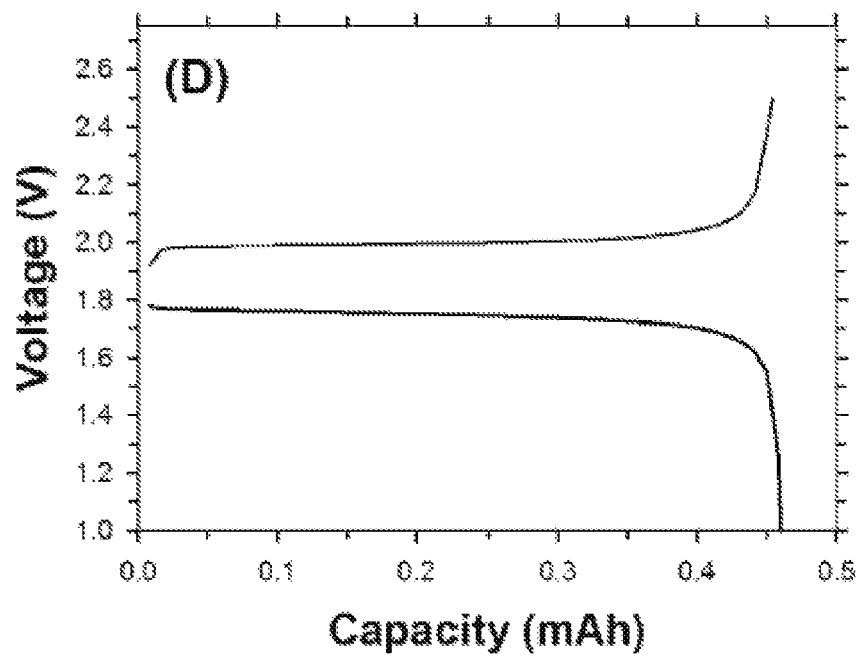
Figure 11E:
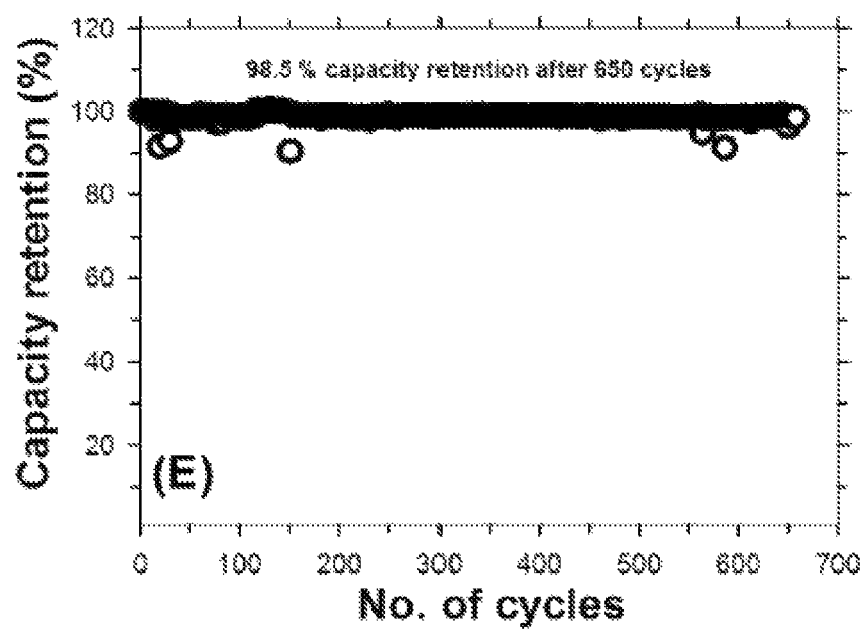

The LTO material synthesized by solid state milling method as mentioned in Example 1 was tested for electrochemical efficiency in full cell configuration with combination of LiFePO$_4$ as cathode. The composite cathode consists of 88:8:4 (LFP:CB:PVDF) in the weight ratio. The cathode laminate thickness was 60 μm and the active materials loading was 3 mg/cm$^2$. The anode consists of 80:10:10 (LTO:CB:PVDF) in the weight ratio. The anode laminate thickness was 50 μm and the active materials loading was 2.6 mg/cm$^2$. The capacities were matched based on the half cell performance of LTO and LFP vs. Li metal. The anode to cathode active material weight ratio was maintained to be 0.88:1. The electrochemical performance of LFP-LTO full cell was tested using borosilicate glass fibre separator in 2032 type coin cell with 1M LiPF$_6$ in EC:DEC:DMC (Geylon, PR China) as electrolyte. The initial charge process was carried out at C/10 rate, which is known as the formation step. The full cell delivered a capacity of 0.65 mAh during the formation step as shown in FIG. 11A. The electrochemical cycling test was carried out at C/5 rate. The full cell exhibited a capacity of 0.5 mAh after the formation step which corresponds to an irreversible loss (IRL) of 23% (FIG. 11B). The capacity retention at C/5 rate is shown in FIG. 11C, which is 100% up to 15 cycles. The long term cycling of the full cell is tested at 1 C current rate. The charge-discharge profiles of the LFP-LTO full cell for the 1st cycle at 1 C is shown in FIG. 11D. The capacity obtained at 1 C rate was 0.47 mAh. The long term stability of the full cell is shown in FIG. 11E with 98.5% retention after 650 charge-discharge cycles.

Present embodiment explained the method of producing the lithium titanate anode with in-situ carbon coating, smaller particle size with $Ti^{3+}$ ions and oxygen vacancies. The invention highlights a reliable method for up-scaling of nano materials using a simple, cost effective technique. It used titanium dioxide and lithium carbonate as titanium and lithium precursors along with process control agent to improve the efficiency of milling process. The parameters like ratios of different phases of titanium dioxide precursor suitable for producing single phase, crystalline lithium titanate powders with oxygen vacancies, annealing atmosphere, annealing time are optimized and corresponding physicochemical and electrochemical studies were carried out as explained in above mentioned examples. It is identified that mixed phases of titanium dioxide milled with lithium carbonate in horizontal attrition mill was efficient in creating highly performing anode material with desirable characteristics for lithium ion battery applications.

We have bought out the novel features of the invention by explaining some of its preferred embodiments thereby enabling any person skilled in the art to understand and visualize our invention. It is also to be understood that the above invention is not limited in its application to the details set forth in the above description or illustrated in the drawings. The phraseology and terminology employed herein are for the purpose of description only and should not be regarded as limiting. Although the invention has been preferred embodiments thereof, variations and modifications can be affected within the spirit and scope of the invention as described herein above and as defined in the appended claims.

We claim:
1. A method of producing nano sized lithium titanate powders for making an anode for a lithium ion battery, using horizontal attrition milling comprising the steps of:
   a) mixing 60-80% anatase and 20-40% rutile $TiO_2$ with $Li_2CO_3$ in a stoichiometric ratio of 5:4 with 5 wt % of extra lithium carbonate to provide a mixture;
   b) adding 2 to 5% stearic acid to the mixture;
   c) milling the mixture and the stearic acid in a horizontal attrition milling unit with a ball to powder ratio of 10:1-12:1 at a speed of 100-250 rpm for 0.5-2 hrs to provide a blended product;
   d) milling the blended product in a horizontal attrition milling unit with a ball to powder ratio of 10:1-12:1 at a speed of 250-500 rpm for 0.5-2 hrs for 40 to 48 times in a pattern including increasing and decreasing the speed for a period of 0.5 to 2 hrs to provide a milled powder;
   e) discharging the milled powder from the horizontal attrition milling unit on completion of milling and storing them for annealing in dry form;
   f) pelletizing the milled powder using a 30-35 mm die at a pressure of 0.5-1 ton using a hydraulic press to provide a pelletized powder;
   g) annealing the pelletized powder under an inert atmosphere of argon in a tubular furnace maintained at a temperature ranging from 700-900° C. with a heating rate of 10° C./min for a period of 2-12 hrs to provide annealed pellets; and
   h) grinding the annealed pellets to provide the nano sized lithium titanate powder.

2. The method of claim 1, further comprising forming $Ti^{3+}$ ions and oxygen vacancies during the annealing.

3. The method of claim 1, wherein an average particle size of the lithium titanate from 200-750 nm.

4. The method of claim 1, wherein a carbon layer on the lithium titanate has a thickness in a range of 2.0-8 nm, when analyzed by HR-TEM analysis.

5. The method of claim 1, wherein the lithium titanate has an electrochemical efficiency in range of 150-156 mAh·$g^{-1}$, when determined at a 1 C rate.

6. The method claim 1, wherein the lithium titanate powder has a coulombic efficiency of 99%, when tested in a full cell configuration.

* * * * *